(12) United States Patent
Maltais-Larouche et al.

(10) Patent No.: US 12,434,506 B2
(45) Date of Patent: Oct. 7, 2025

(54) VEHICLE WITH A WHEEL HUB ASSEMBLY

(71) Applicant: BOMBARDIER RECREATIONAL PRODUCTS INC., Valcourt (CA)

(72) Inventors: Emile Maltais-Larouche, Valcourt (CA); Charles Lachance, Sherbrooke (CA); Nicolas Laberge, Phoenix, AZ (US)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 1093 days.

(21) Appl. No.: 16/767,405

(22) PCT Filed: Oct. 22, 2018

(86) PCT No.: PCT/IB2018/058215
§ 371 (c)(1),
(2) Date: May 27, 2020

(87) PCT Pub. No.: WO2019/106452
PCT Pub. Date: Jun. 6, 2019

(65) Prior Publication Data
US 2020/0307308 A1    Oct. 1, 2020

Related U.S. Application Data

(60) Provisional application No. 62/592,573, filed on Nov. 30, 2017.

(51) Int. Cl.
*B60B 27/06* (2006.01)
*B60B 3/14* (2006.01)
(Continued)

(52) U.S. Cl.
CPC .............. *B60B 27/06* (2013.01); *B60T 1/065* (2013.01); *B60B 3/142* (2013.01); *B60B 27/0026* (2013.01); *B62D 61/065* (2013.01)

(58) Field of Classification Search
CPC ..... B60B 27/06; B60B 27/0026; B60B 3/142; B60T 1/065; B62D 61/065
(Continued)

(56) References Cited

U.S. PATENT DOCUMENTS 2,640,728 A * 6/1953 Slack ........................ B60B 3/14
29/273
4,082,167 A 4/1978 Einchcombe et al.
(Continued)

FOREIGN PATENT DOCUMENTS

DE    102010049797 A1 * 5/2012  .............. B60T 1/065
KR    20060085123    * 8/2006  ............. B60B 27/94
(Continued)

OTHER PUBLICATIONS

Merged text and image of WO-9813220-A1 (Year: 1998).*
International Search Report of PCT/IB2018/058215, Jan. 25, 2019, Shane Thomas.

*Primary Examiner* — S. Joseph Morano
*Assistant Examiner* — Eva L Comino
(74) *Attorney, Agent, or Firm* — BCF LLP

(57) ABSTRACT

A wheel hub assembly for a vehicle includes a shaft adapted for operatively connecting to a motor of the vehicle. The shaft including a threaded end portion, and a splined portion including a plurality of external splines; an integral braking hub disposed on and connected to the shaft; a wheel fastened to the integral braking hub by a plurality of fasteners; and a nut fastened to the threaded end portion of the shaft, the wheel being disposed between the nut and the brake disc portion in an axial direction of the shaft. The integral braking hub includes a central hub portion including a plurality of internal splines and a brake disc portion extending radially from the central hub portion, the brake disc portion being integral with the central hub portion and the central hub (Continued)

portion or the brake disc portion defining a plurality of through-holes.

7 Claims, 25 Drawing Sheets

(51) Int. Cl.
    *B60B 27/00*     (2006.01)
    *B60T 1/06*     (2006.01)
    *B62D 61/06*     (2006.01)

(58) Field of Classification Search
    USPC .................................................. 301/111.01
    See application file for complete search history.

(56) References Cited

U.S. PATENT DOCUMENTS

| | | | | |
|---|---|---|---|---|
| 4,299,425 A | * | 11/1981 | Renz | B60B 7/14 |
| | | | | 301/114 |
| 4,352,414 A | | 10/1982 | Scott | |
| 4,354,711 A | * | 10/1982 | Main | B60B 3/142 |
| | | | | 403/166 |
| 4,898,429 A | | 2/1990 | Plumer | |
| 5,390,771 A | | 2/1995 | Hinkens et al. | |
| 5,601,343 A | * | 2/1997 | Hoffken | B60B 1/06 |
| | | | | 301/111.04 |
| 5,820,224 A | * | 10/1998 | Dimatteo, Jr. | B60B 1/044 |
| | | | | 301/105.1 |
| 6,193,320 B1 | * | 2/2001 | Weiss | B60B 25/002 |
| | | | | 301/35.63 |
| 8,393,306 B2 | | 3/2013 | Schiffer et al. | |
| 2002/0063010 A1 | | 5/2002 | Morin | |
| 2004/0117969 A1 | * | 6/2004 | Avery | B25B 27/0035 |
| | | | | 29/273 |
| 2008/0023242 A1 | | 1/2008 | Lechapelle et al. | |
| 2009/0266655 A1 | | 10/2009 | Mikura et al. | |
| 2014/0004984 A1 | | 1/2014 | Aitcin | |

FOREIGN PATENT DOCUMENTS

| | | | | |
|---|---|---|---|---|
| WO | WO-9813220 A1 | * | 4/1998 | ............ B60B 23/10 |
| WO | WO-201717506 A1 | * | 2/2017 | ........... B60G 15/067 |
| WO | WO-2017130174 | * | 8/2017 | ............... B62K 5/05 |

* cited by examiner

VEHICLE WITH A WHEEL HUB ASSEMBLY

CROSS-REFERENCE

The present application claims priority to U.S. Provisional Patent Application No. 62/592,573, entitled "Vehicle with a Wheel Hub Assembly," filed on Nov. 30, 2017, the entirety of which is incorporated herein by reference.

FIELD OF TECHNOLOGY

The present technology relates to wheel hub assemblies and vehicles having a wheel hub assembly.

BACKGROUND

In two-, three-, and four-wheeled vehicles, propulsion is provided through at least one driven wheel assembly. In such an assembly, a wheel hub supports a wheel driven by a propulsion system to move the vehicle. Generally, such driven wheel assemblies include a hub fastened to a rotating shaft. The wheel is then connected to the rotating hub by a set of bolts. Driving torque from the rotating hub is transferred to the wheel through the bolts.

In order to provide braking for the driven wheel, a brake disk is also generally fastened to the rotating hub by a second set of bolts. Braking torque, caused by friction between brake pads and the brake disk, is transmitted from the disk to the rotating hub via the second set of bolts and from the rotating hub to the wheel via the first set of bolts.

In order to remove the wheel, all of the bolts connecting the wheel to the rotating hub must be removed. The wheel can then be removed from the hub, while the brake disk remains attached to the hub. In order to subsequently remove the brake disk, a caliper disposed around the brake disk is removed, as well as the bolts connecting the brake disk to the rotation hub.

There remains a desire for different wheel hub assembly technologies for vehicles.

SUMMARY

It is an object of the present technology to ameliorate at least some of the inconveniences present in the prior art.

According to one aspect of the present technology, there is provided a wheel hub assembly including an integral braking hub. The wheel is fastened to the integral braking hub, which includes a brake disc portion for braking the wheel, in cooperation with a caliper and brake pad assembly. The integral braking hub is disposed around an output shaft, and is engaged with the shaft via splines such that rotation of the output shaft drives rotation of the wheel, via the integral braking hub. A nut at a distal end of the shaft acts to retain the wheel and the hub on the shaft. As such, installation and removal of the wheel onto and from the vehicle involves manipulation of one nut, rather than needing to remove a plurality of bolts between the wheel and the hub. Replacement of a plurality of bolts with a single central nut can also simplify the aesthetic appearance of the wheel. Torque for driving the wheel and for braking the wheel are further both applied to the wheel through the integral braking hub. This reduces the overall number of fasteners necessary for assembling the wheel hub assembly, which in turn reduces the number of parts can that experience a failure in operation.

According to one aspect of the present technology, there is provided a wheel hub assembly for a vehicle. The wheel hub assembly including a shaft adapted for operatively connecting to a motor of the vehicle, the shaft including a threaded end portion, and a splined portion including a plurality of external splines; an integral braking hub disposed on and connected to the shaft, the integral braking hub including a central hub portion including a plurality of internal splines engaging the plurality of external splines of the splined portion of the shaft, and a brake disc portion extending radially from the central hub portion, the brake disc portion being integral with the central hub portion, at least one of the central hub portion and the brake disc portion defining a plurality of through-holes; a wheel fastened to the integral braking hub by a plurality of fasteners, each one of the plurality of fasteners passing through a corresponding one of the plurality of through-holes; and a nut fastened to the threaded end portion of the shaft, the wheel being disposed between the nut and the brake disc portion in an axial direction of the shaft.

In some implementations of the present technology, the wheel includes a rim, and a tire mounted on the rim; the nut has a frustoconical surface on a wheel facing side of the nut; and the rim has a corresponding frustoconical recess for receiving the nut.

In some implementations of the present technology, the wheel hub assembly further includes a locking member extending at least partially through the nut and the shaft.

In some implementations of the present technology, the splined portion of the shaft is a first splined portion; the plurality of external splines is a first plurality of external splines; the shaft further includes a second splined portion, the second splined portion including a second plurality of external splines; and the first splined portion and the second splined portion are spaced apart in the axial direction.

In some implementations of the present technology, the wheel hub assembly further includes a gear disposed on the shaft, the gear defining a plurality of internal gear splines engaging the second plurality of external splines of the second splined portion, the gear being adapted for operatively connecting the shaft to the motor of the vehicle.

In some implementations of the present technology, the wheel hub assembly further includes at least one bearing disposed around the shaft for rotationally supporting the shaft on the vehicle, the at least one bearing being disposed between the first splined portion and the second splined portion in the axial direction.

In some implementations of the present technology, a largest diameter of the shaft is disposed between the at least one bearing and the second splined portion in the axial direction.

In some implementations of the present technology, the wheel hub assembly further comprising a caliper and brake pad assembly for engaging with the brake disc portion of the integral braking hub for braking the wheel, the caliper and brake pad assembly being adapted for connecting to a rear suspension system of the vehicle.

According to another aspect of the present technology, there is provided a vehicle including a frame; at least one front suspension system connected to the frame; at least one front ground engaging member, the at least one ground engaging member being operatively connected to the at least one front suspension system; at least one seat connected to and supported by the frame; a motor connected to and supported by the frame; a rear suspension system connected to the frame; a wheel hub assembly connected to the rear suspension system. The wheel hub assembly includes a shaft operatively connected to the motor, the shaft including a threaded end portion, and a splined portion including a plurality of external splines; an integral braking hub disposed on and connected to the shaft, the integral braking hub including: a central hub portion including a plurality of internal splines engaging the plurality of external splines of the splined portion of the shaft, and a brake disc portion extending radially from the central hub portion, the brake disc portion being integral with the central hub portion, at least one of the central hub portion and the brake disc portion defining a plurality of through-holes; a wheel fastened to the integral braking hub by a plurality of fasteners, each one of the plurality of fasteners passing through a corresponding one of the plurality of through-holes; and a nut fastened to the threaded end portion of the shaft, the wheel being disposed between the nut and the brake disc portion in an axial direction of the shaft.

In some implementations of the present technology, the splined portion of the shaft is a first splined portion; the plurality of external splines is a first plurality of external splines; the shaft further includes a second splined portion, the second splined portion including a second plurality of external splines; and the first splined portion and the second splined portion are spaced apart in the axial direction.

In some implementations of the present technology, the vehicle further includes a gear disposed on the shaft, the gear including a plurality of gear teeth, and a plurality of internal gear splines engaging the second plurality of external splines of the second splined portion; a driveshaft disposed at least in part in the rear suspension system, a first end of the driveshaft being pivotably and operatively connected to the motor; and a pinion operatively connected to a second end of the driveshaft, the pinion including a plurality of teeth, the plurality of teeth of the pinion engaging the plurality of gear teeth of the gear to drive the shaft.

In some implementations of the present technology, the vehicle further includes at least one bearing disposed around the shaft for rotationally supporting the shaft, the at least one bearing being disposed between the first splined portion and the second splined portion in the axial direction.

In some implementations of the present technology, the vehicle further includes a caliper and brake pad assembly for engaging with the brake disc portion of the integral braking hub for braking the wheel, the caliper and brake pad assembly being connected to the rear suspension system.

In some implementations of the present technology, the caliper and brake pad assembly is connected to the rear suspension system via two bolts; and the caliper and brake pad assembly can be pivoted away from the integral braking hub about one of the two bolts when an other one of the two bolts is removed from the caliper and brake pad assembly.

In some implementations of the present technology, the wheel is removable from the rear suspension system when the caliper and brake pad assembly is pivoted away from the integral braking hub, and the nut is removed from the shaft; and the wheel and the integral braking hub are removed from the vehicle together by sliding the wheel along the shaft and away from the rear suspension system.

In some implementations of the present technology, the rear suspension system includes a swing arm pivotably connected to the frame, the wheel hub assembly being connected to a rear end portion of the swing arm.

In some implementations of the present technology, the wheel includes a rim, and a tire mounted on the rim; the nut has a frustoconical surface on a wheel facing side of the nut; and the rim has a corresponding frustoconical recess for receiving the nut.

In some implementations of the present technology, the vehicle further includes a locking member extending at least partially through the nut and the shaft.

In some implementations of the present technology, the vehicle further includes a rear fender assembly connected to the rear suspension system, the rear fender assembly extending at least partially behind the wheel.

In some implementations of the present technology, the at least one front suspension system is a left front suspension system and a right front suspension system; and the at least one front ground engaging member is a left front wheel connected to the left front suspension system and a right front wheel connected to the right front suspension system.

According to another aspect of the present technology, there is provided a method for removing a wheel from a vehicle, the wheel being disposed on a shaft between a nut fastened to a shaft and an integral braking hub fastened to the wheel. The method includes removing a first fastener from a caliper and brake pad assembly, the caliper and brake pad assembly being disposed at least in part over a brake disc portion of the integral braking hub; loosening a second fastener connected to the caliper and brake pad assembly; pivoting the caliper and brake pad assembly rearward and away from the integral braking hub about the second fastener; removing the nut from the shaft; and sliding the wheel and the integral braking hub together off of the shaft once the nut is removed and the caliper and brake pad assembly is pivoted away from the integral braking hub.

For the purposes of the present application, terms related to spatial orientation such as forward, rearward, front, rear, upper, lower, left, and right, are as they would normally be understood by a driver of the vehicle sitting therein in a normal driving position with the vehicle being upright and steered in a straight ahead direction.

Explanations and/or definitions of terms provided in the present application take precedence over explanations and/or definitions of these terms that may be found in the document incorporated herein by reference.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

Figure 1:
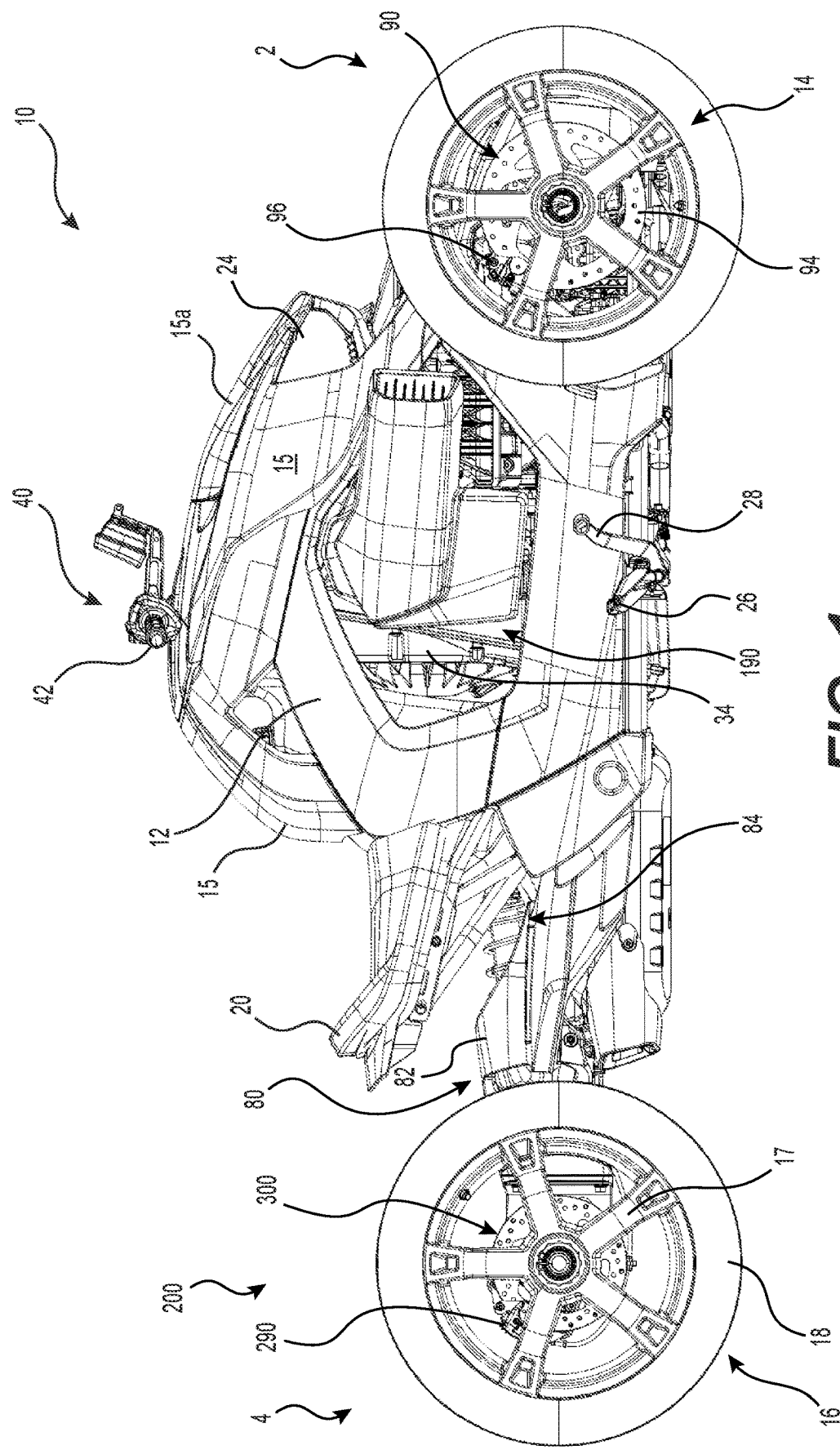
FIG. 1 is a right side elevation view of a vehicle according to the present technology.

It should also be noted that, unless otherwise explicitly specified herein, the drawings are not necessarily to scale.

DETAILED DESCRIPTION

The present technology will be described herein with respect to a three-wheeled straddle-type vehicle 10. It is contemplated that at least some aspects of the present technology could also be implemented with vehicles have two, four, or more wheels.

With reference to FIGS. 1 to 4, a vehicle 10 has a front end 2, a rear end 4, and a longitudinal centerplane 3 defined consistently with the forward travel direction of the vehicle 10. The vehicle 10 has a frame 12 on which various components of the vehicle 10 are supported.

The vehicle 10 is a three-wheeled vehicle 10 including a left front wheel 14 mounted to the frame 12 by a left front suspension assembly 70, a right front wheel 14 mounted to the frame 12 by a right front suspension assembly 70, and a single rear wheel 16 mounted to the frame 12 by a rear suspension assembly 80. The rear suspension assembly 80 will be described in more detail below.

The left and right front wheels 14 each have a tire secured thereto. The rear wheel 16 similarly includes a rim 17 and a tire 18 secured to the rim 17. The front wheels 14 are disposed equidistant from the longitudinal centerplane 3, and the rear wheel 16 is centered with respect to the longitudinal centerplane 3. It is contemplated that the present technology, or at least some aspects thereof, could also be implemented on a vehicle with two rear wheels 16 and a single, centered front wheel 14 or on a vehicle with a single, centered front wheel 14 and a single, centered rear wheel 16.

Figure 2:
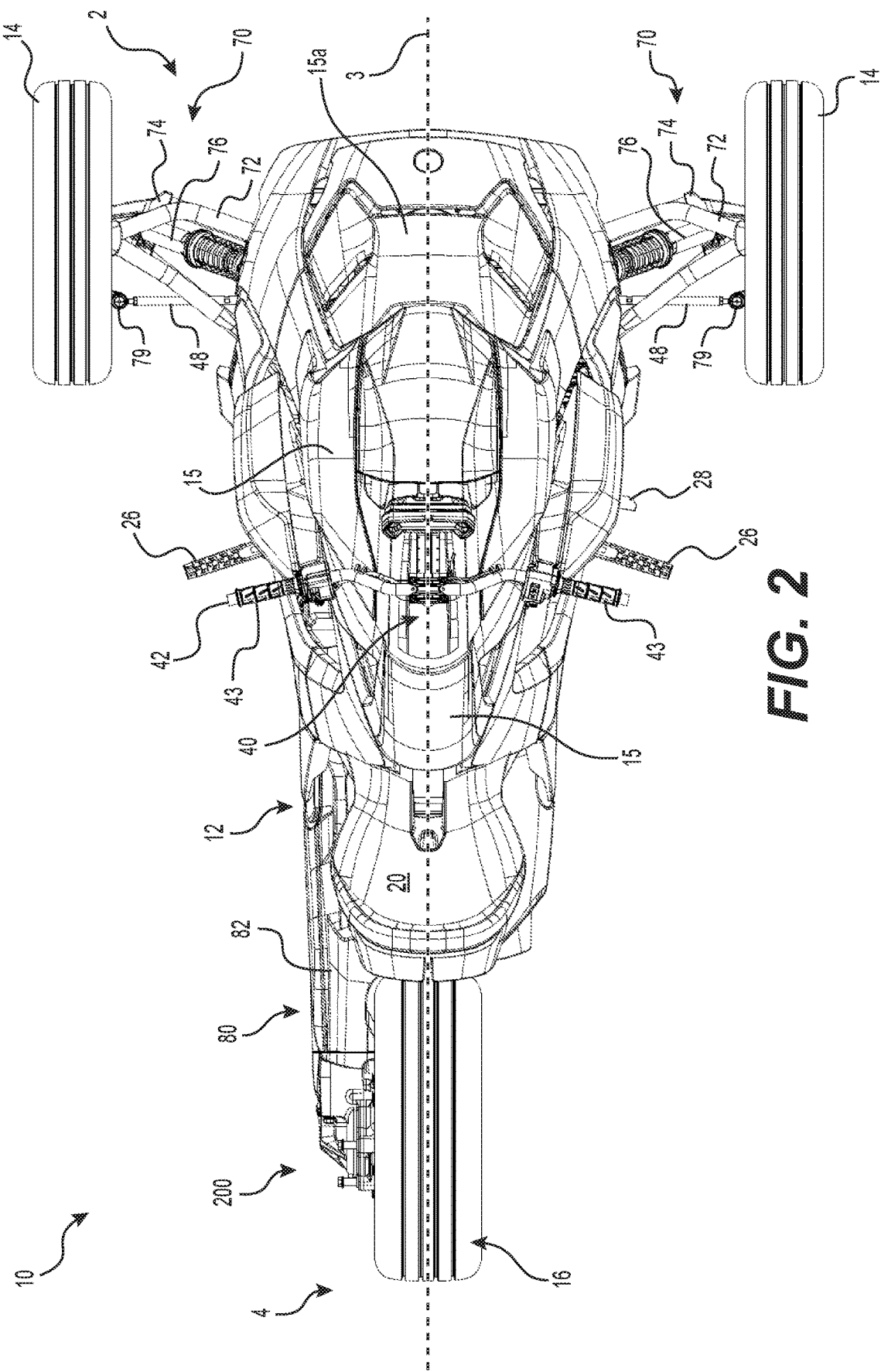
FIG. 2 is a top plan view of the vehicle of FIG. 1.

In the illustrated implementation and as can be seen in FIG. 2, each front suspension assembly 70 is a double A-arm type suspension 70, also known as a double wishbone suspension. It is contemplated that other types of suspensions, such as a MacPherson strut suspension, telescoping tube, multi-link, or swing arm could be used. Each front suspension assembly 70 includes an upper A-arm 72, a lower A-arm 74 and a shock absorber 76. The right front suspension assembly 70 is a mirror image of the left front suspension assembly 70, and as such only the left front suspension assembly 70 will be described herein. Each A-arm 72, 74 has a front member and a rear member. The laterally outer ends of the front and rear members are connected to each other while the laterally inner ends of the front and rear members of each A-arm 72, 74 are spaced apart from each other.

The lower end of the shock absorber 76 is connected to the front and rear members of the lower A-arm 74 slightly laterally inward of the laterally outer ends. The laterally inner ends of the upper and lower A-arms 72, 74 are pivotally connected to the frame 12. The laterally outer ends of the upper and lower A-arms 72, 74 are pivotally connected to the top and bottom respectively of a knuckle (not shown) connected to the front wheel 14.

The rear suspension assembly 80 includes a swing arm 82 and a shock absorber 84. The swing arm 82 is pivotally mounted at a front thereof to the frame 12. Specifically, the frame 12 includes a left swing arm bracket 112 and a right swing arm bracket 112. The swing arm 82 includes a corresponding left front portion 85 and a right front portion 85 which connect pivotably to the brackets 112 by bolts.

The rear wheel 16 is rotatably mounted to the rear end of the swing arm 82 which extends on a left side of the rear wheel 16. The rear wheel 16 is mounted on a final drive unit 205, which in turn is mounted to the swing arm 82. The final drive unit 205, and components thereof, will be described in more detail below. The final drive unit 205 includes a final drive unit housing 207 to protecting the components of the final drive unit 205 The shock absorber 84 is connected between the swing arm 82 and the frame 12.

The vehicle 10 has a straddle seat 20 mounted to the frame 12 and disposed along the longitudinal centerplane 3. In the illustrated implementation, the straddle seat 20 is intended to accommodate a single adult-sized rider, i.e. the driver. A driver footrest 26 is disposed on either side of the vehicle 10 and vertically lower than the straddle seat 20 to support the driver's feet (see FIG. 1). In the implementation of the vehicle 10 illustrated herein, the driver footrests 26 are in the form of foot pegs disposed longitudinally forward of the straddle seat 20. It is also contemplated that the footrests 26 could be in the form of footboards. It is contemplated that the vehicle 10 could also be provided with one or more passenger footrests disposed rearward of the driver footrest 26 on each side of the vehicle 10, for supporting a passenger's feet when a passenger seat portion for accommodating a passenger is connected to the vehicle 10. A brake pedal 28 is connected to the right driver footrest 26 for braking the vehicle 10. The brake pedal 28 extends upwardly and forwardly from the right driver footrest 26 such that the driver can actuate the brake pedal 28 with a front portion of the right foot while a rear portion of the right foot remains on the right driver footrest 26.

Figure 3:
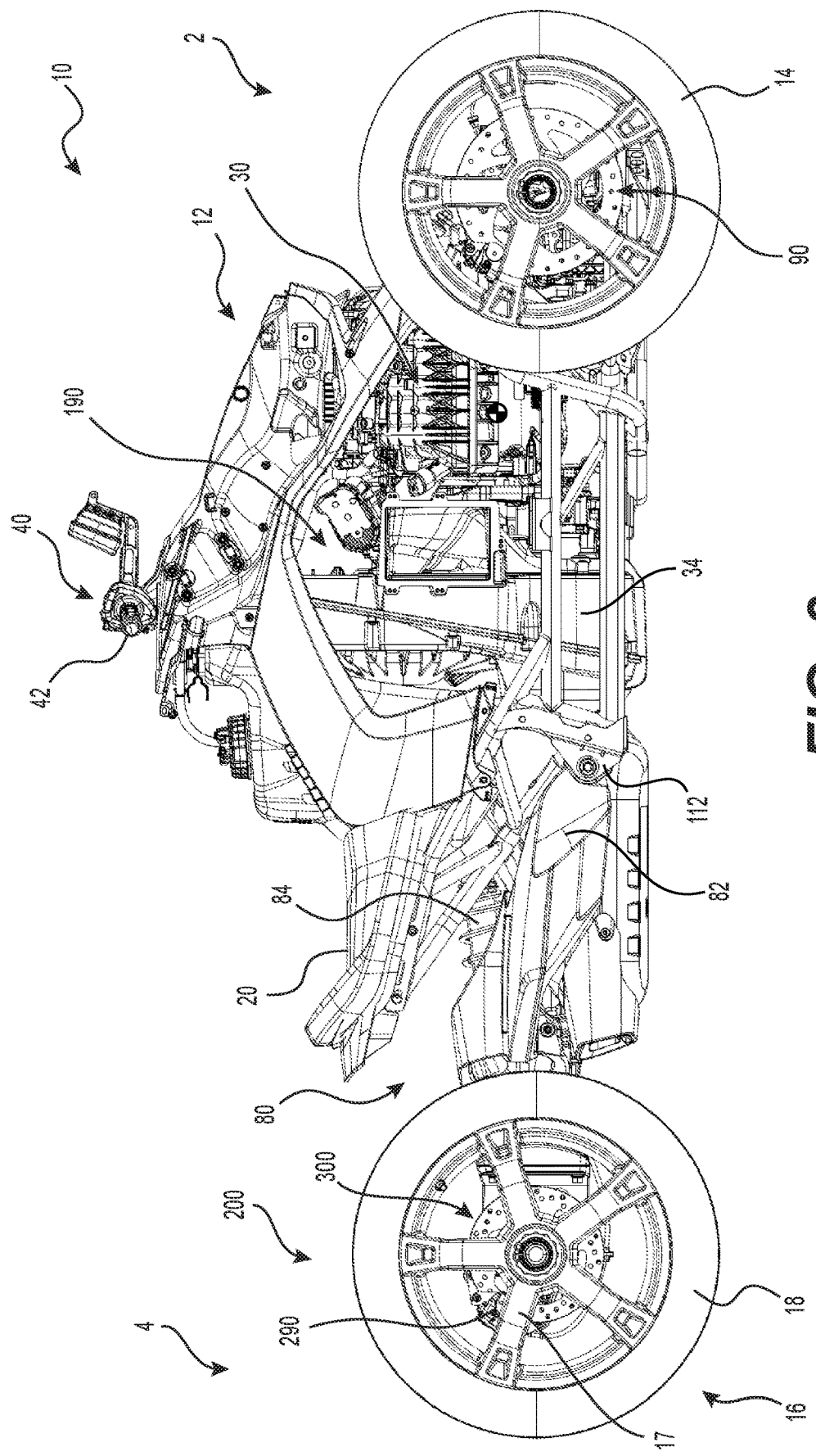
FIG. 3 is a right side elevation view of the vehicle of FIG. 1, with some body panels having been removed to reveal portions of a propulsion system of the vehicle.

With reference to FIGS. 1 to 3, the vehicle 10 includes a steering assembly 40. A handlebar 42, which is part of the steering assembly 40, is disposed in front of the seat 20. The handlebar 42 is used by the driver to turn the front wheels 14 to steer the vehicle 10. A left hand grip 43 is placed around the left side of the handlebar 42 near the left end thereof and a right hand grip 43 is placed respectively right sides of the handlebar 42 near the right end to facilitate gripping for turning the handlebar 42 and thereby steering the vehicle 10. The right hand grip 43 provides twist-grip type throttle control. It is contemplated that the brake pedal 28 could be connected to the left driver footrest 26, or could be replaced with a brake lever at either the left or right hand grips 43.

The vehicle 10 includes body panels 15 which are connected to and supported by the frame 12. The body panels 15 enclose and protect the internal components of the vehicle 10 such as a power pack 190 (described below). The body panels 15 include a hood 15a disposed at the front of the vehicle 10 between the front wheels 14. The vehicle 10 also includes headlights 24 connected to and supported by the frame 12 and/or the body panels 15.

Figure 4:
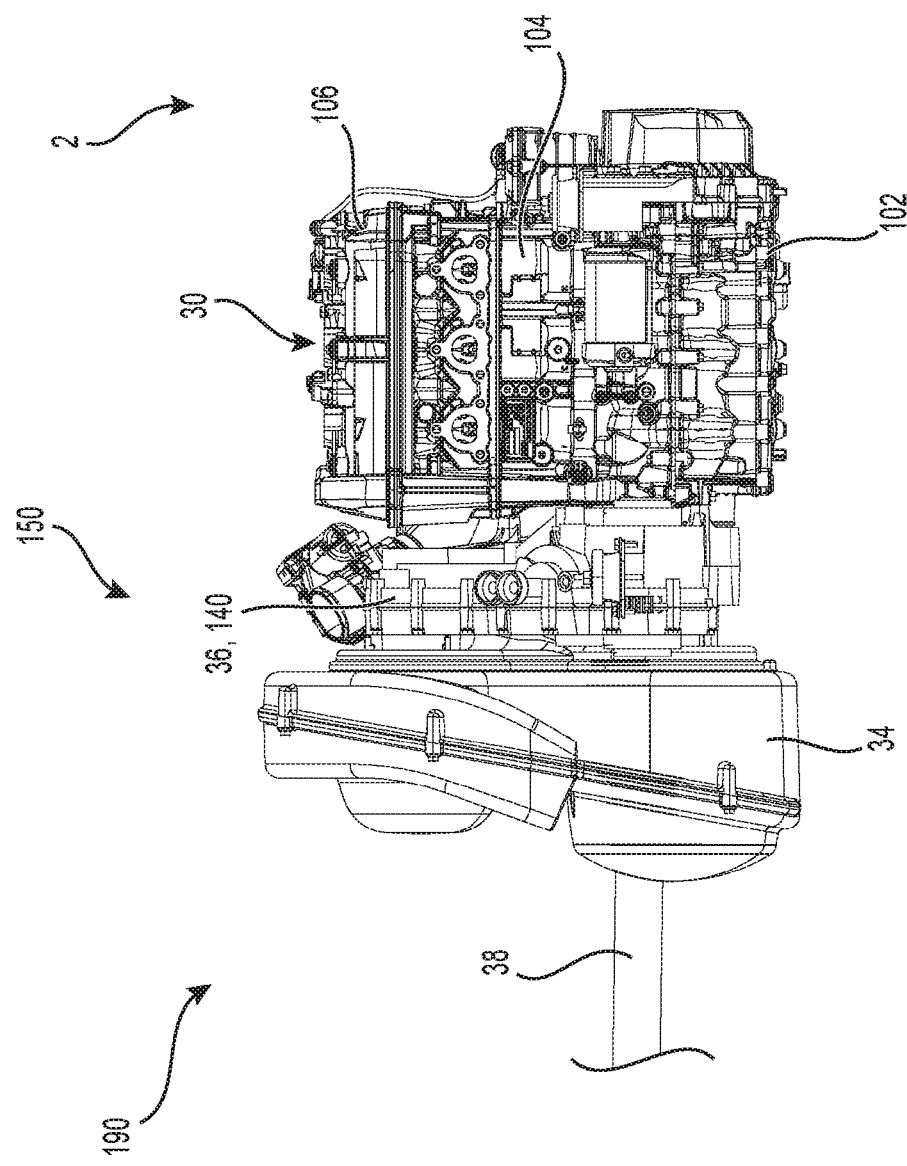
FIG. 4 is a right side elevation view of a portion of the propulsion system of FIG. 3.
Figure 5:
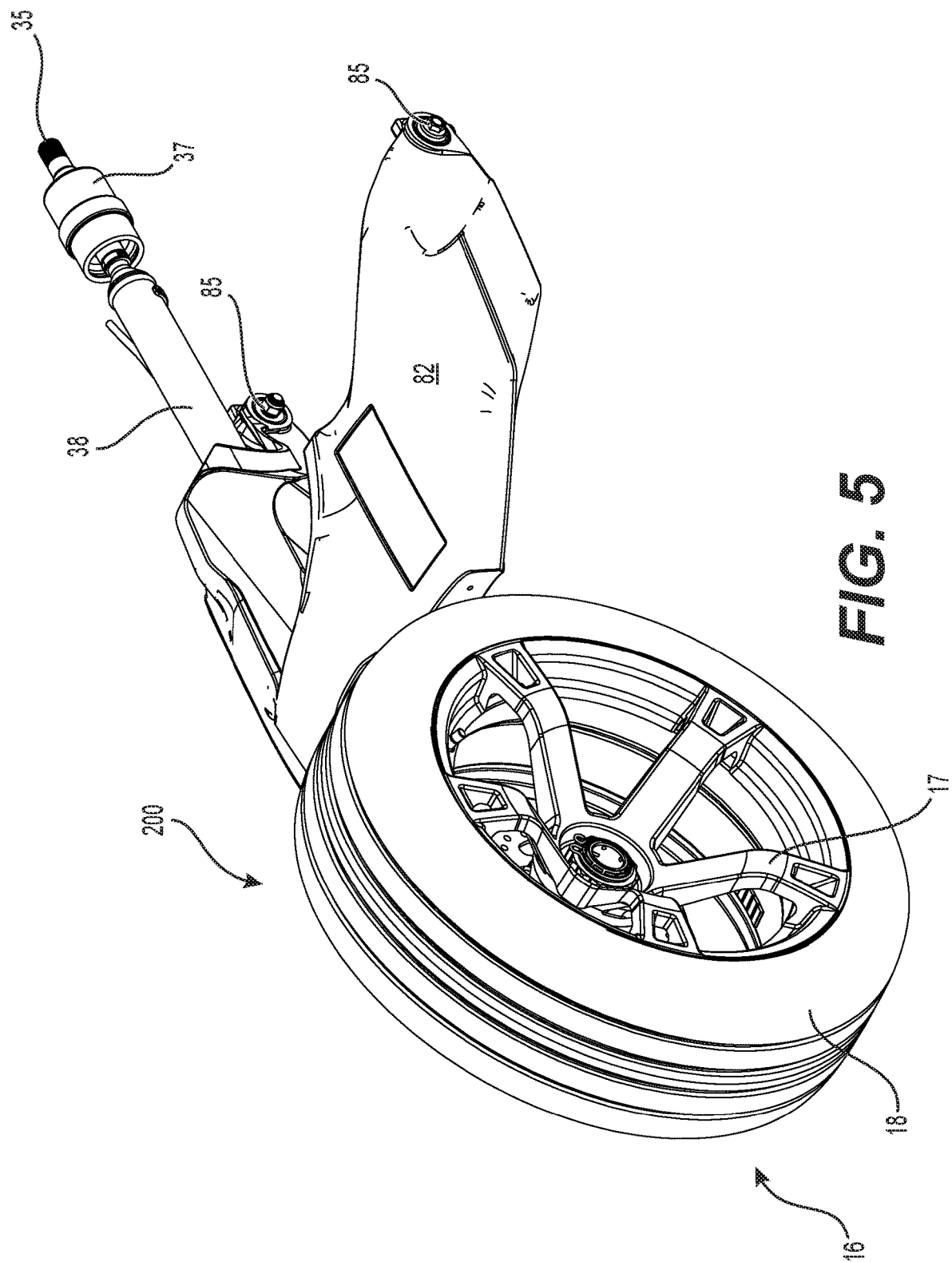
FIG. 5 is a rear, right side perspective view of a swing arm, a driveshaft and a wheel of the vehicle of FIG. 1.
Figure 6:
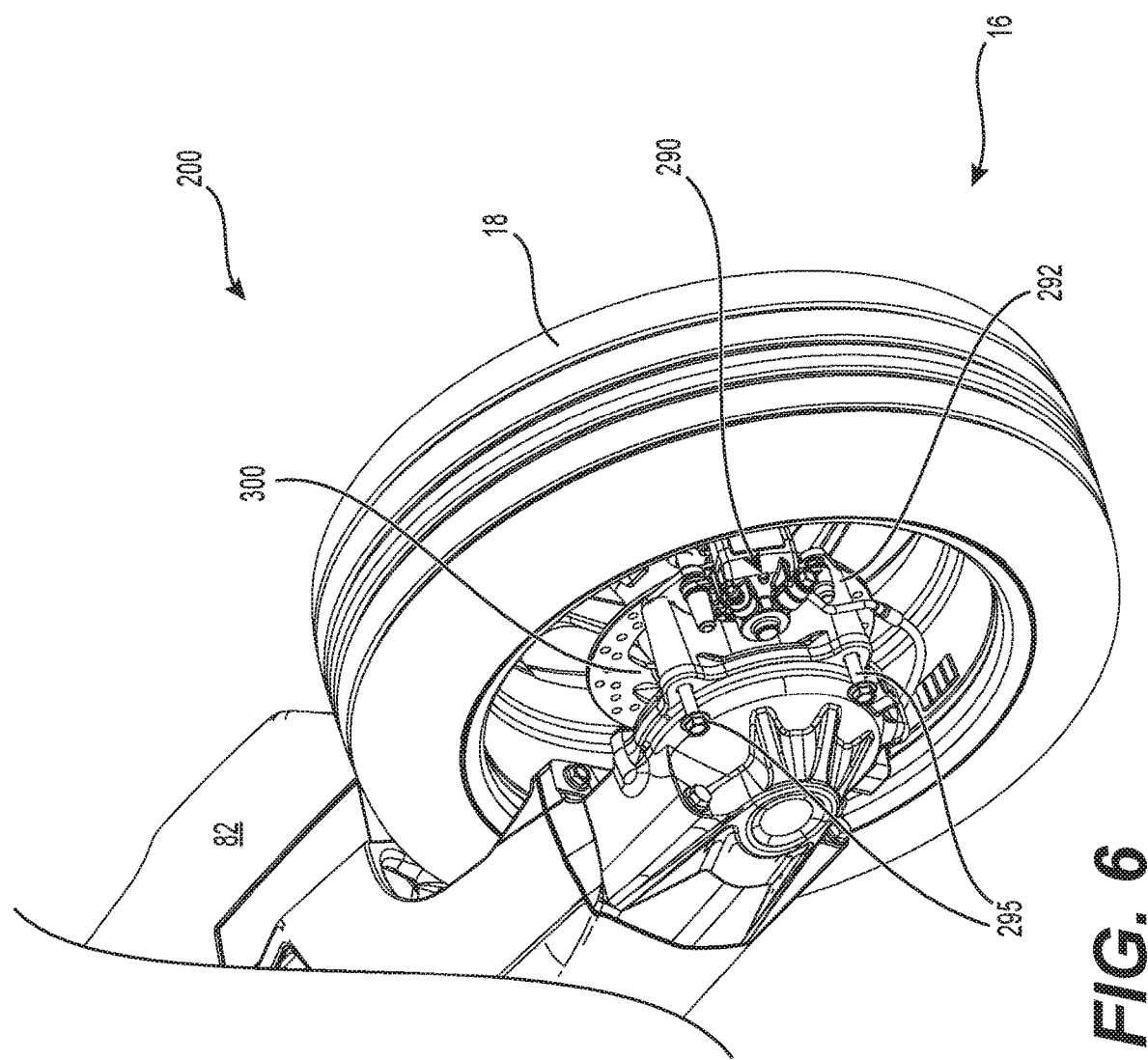
FIG. 6 is a rear, left side perspective view of the swing arm, the wheel, and a wheel hub assembly of FIG. 5.
Figure 7:
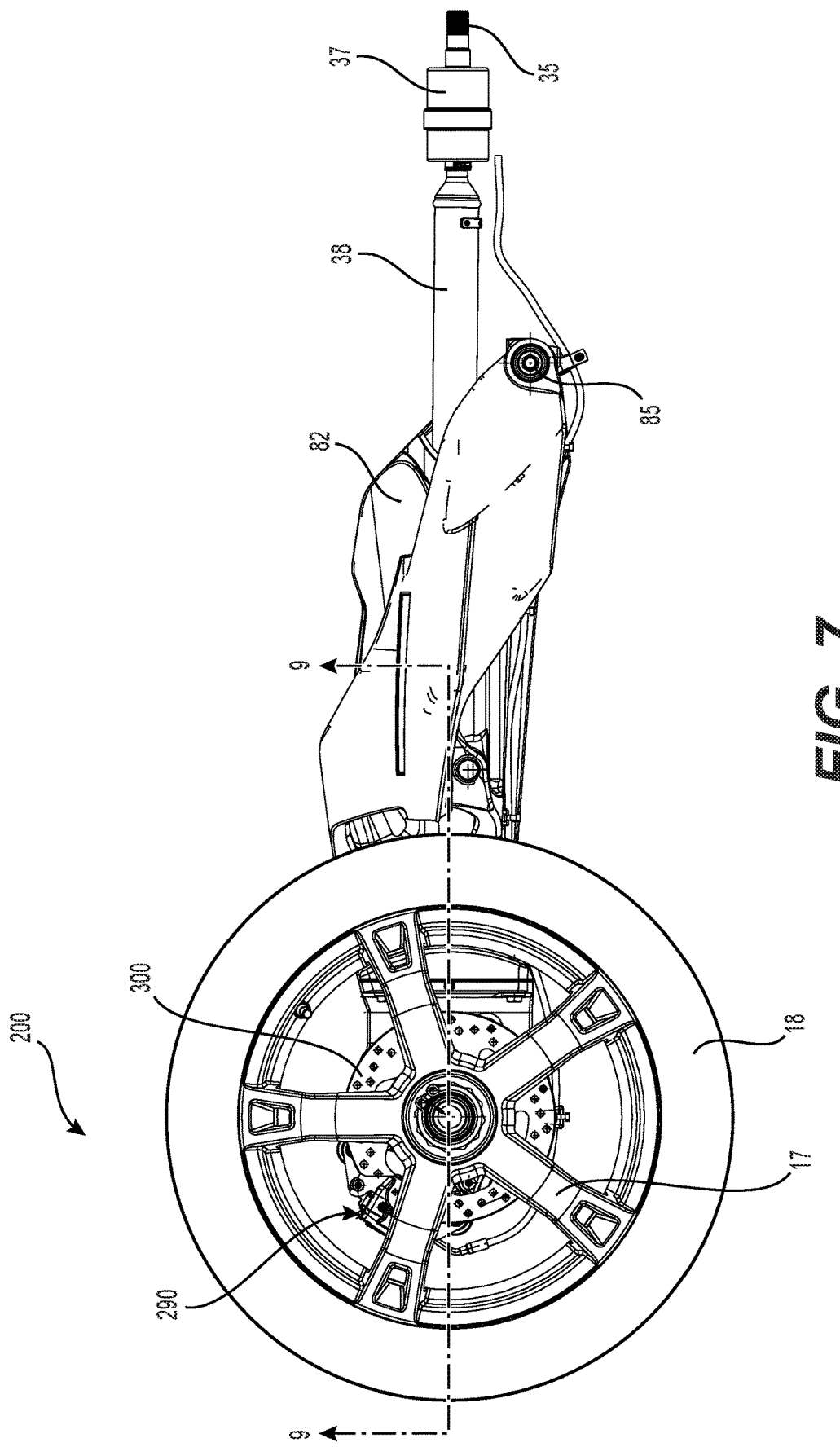
FIG. 7 is a right side elevation view of the swing arm, wheel, wheel hub assembly, and driveshaft of FIG. 5.
Figure 8:
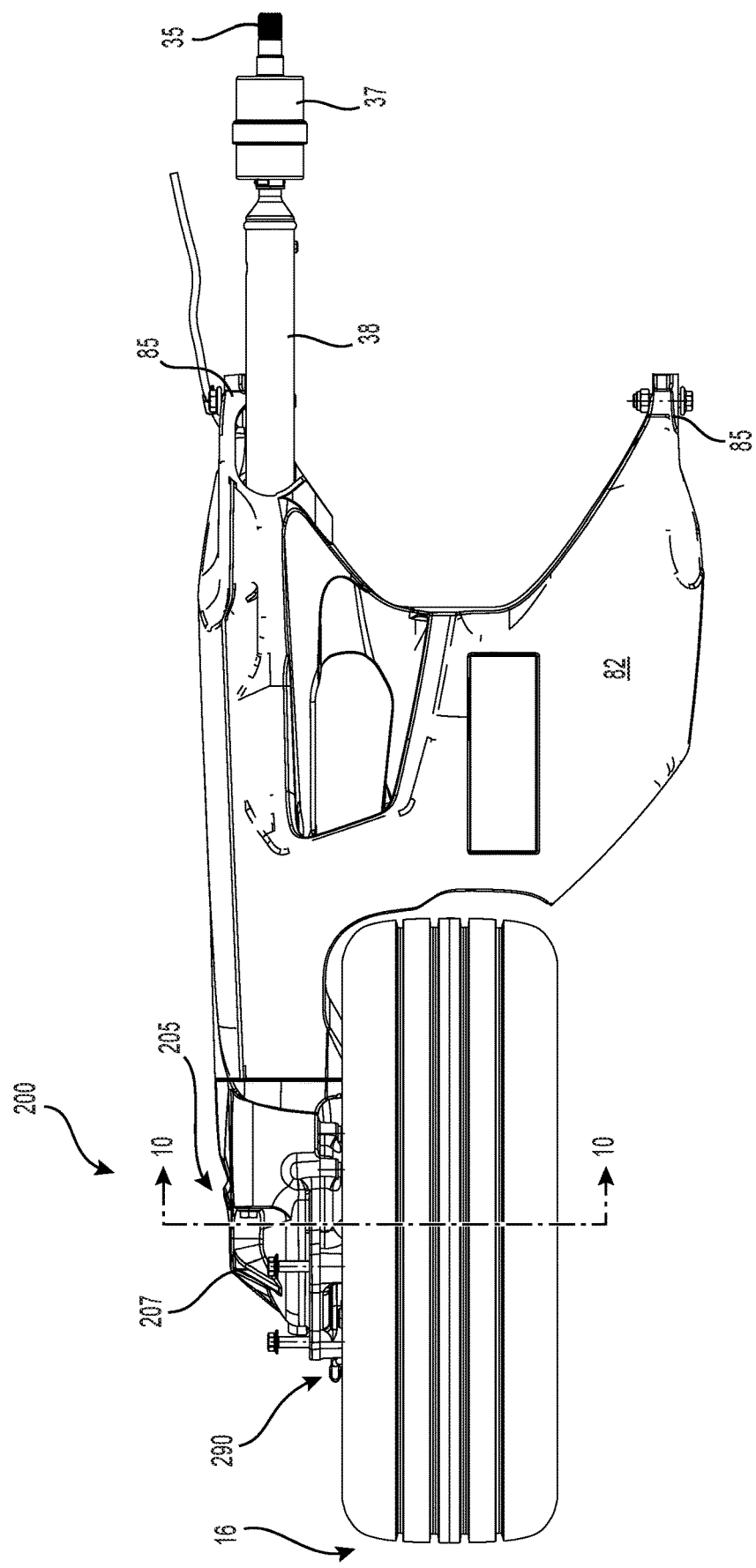
FIG. 8 is a top plan view of the swing arm, wheel, wheel hub assembly, and driveshaft of FIG. 5.

As can be seen in FIGS. 1 and 4, the vehicle 10 includes the power pack 190 supported by and is housed within the frame 12. The power pack 190 includes a motor 30 and a transmission assembly 150. The transmission assembly 150 includes a continuously variable transmission (CVT) 34 and a transfer case 36 in the present implementation. In the illustrated implementation of the vehicle 10, the motor 30 is in the form of an internal combustion engine 30. It is however contemplated that the motor 30 could be other than an internal combustion engine, for example an electric motor, a hybrid or the like. The motor 30 will be referred to hereinafter as engine 30 for convenience. As will be described in more detail below, the engine 30 is operatively connected to the rear wheel 16 to drive the rear wheel 16.

In the present application, the engine 30 and the transmission system 150 are rigidly connected to each other. As can be seen in FIG. 4, the engine 30 has a crankcase 102, a cylinder block 104 disposed on and connected to the crankcase 102, and a cylinder head assembly 106 disposed on and connected to the cylinder block 104. Further detail regarding engines, such as the engine 30, can be found in U.S. Pat. No. 8,393,306 B2, issued on Mar. 12, 2013, the entirety of which is incorporated herein by reference.

The rear wheel 16 is operatively connected to a crankshaft (not shown) of the engine 30 via an engine output shaft (not shown), the CVT 34, the transfer case 36 and a driveshaft 38, as well as additional components described below. It is contemplated that the engine 30 could be connected to the front wheels 14 instead of, or in addition to, the rear wheel 16. Power produced by the engine 30 is transmitted to the CVT 34, then to the transfer case 36, which in turn drives the driveshaft 38 to turn the rear wheel 16.

As can be seen in FIG. 4, the transfer case 36 is disposed rearward of the engine 30. The transfer case 36 includes a transfer case housing 140 which is mounted to the rear end of the engine 30 via the cylinder block 104 and the crankcase 102. The CVT 34 is disposed rearward of the transfer case 36. It is contemplated that the vehicle 10 could have a transmission assembly 150 in which the CVT 34 and the transfer case 36 are replaced by a discrete gear transmission or another type of manual, semi-automatic or automatic transmissions.

A front end of the driveshaft 38 is connected to a joint 37 connected to the transfer case 36 via a shaft 35 and partially enclosed by the transfer case housing 140. The joint 37 illustrated herein is a constant velocity joint 37, also referred to as a homokinetic joint. The driveshaft 38 extends longitudinally and rearwardly out of the transfer case housing 140 on a left side of the longitudinal centerplane 3. The rear end of the driveshaft 38 operatively connected to the rear wheel 16 to drive the rear wheel 16, as will be described in more detail below.

With reference to FIGS. 1 and 3, each of the two front wheels 14 is provided with a brake assembly 90. The rear wheel 16 is part of a wheel hub assembly 200 which will be described in more detail below. Each brake assembly 90 is a disc-type brake assembly mounted onto the spindle of the respective wheel 14. Other types of brake assemblies are contemplated. Each brake assembly 90 includes a rotor 94 mounted onto the wheel hub and a stationary caliper 96 straddling the rotor 94. The brake pads (not shown) are mounted to the caliper 96 so as to be disposed between the rotor 94 and the caliper 96 on either side of the rotor 94. The brake pedal 28 is operatively connected to the brake assemblies 90 provided on each of the two front wheels 14 as well as to a caliper and brake pad assembly 290 of the wheel hub assembly 200, hereinafter referred to as the brake assembly 290 for simplicity. It is contemplated that braking of the front wheels 14 and the rear wheel 16 could be controlled through separate mechanisms in some implementations.

The vehicle 10 further includes a driven wheel hub assembly 200 for driving the vehicle 10, which includes the driven rear wheel 16. With reference to FIGS. 6 to 15, the wheel hub assembly 200 will now be described in more detail. In implementations of vehicles with more than three wheels, it is contemplated that a vehicle could include more than one wheel hub assembly 200.

Figure 9:
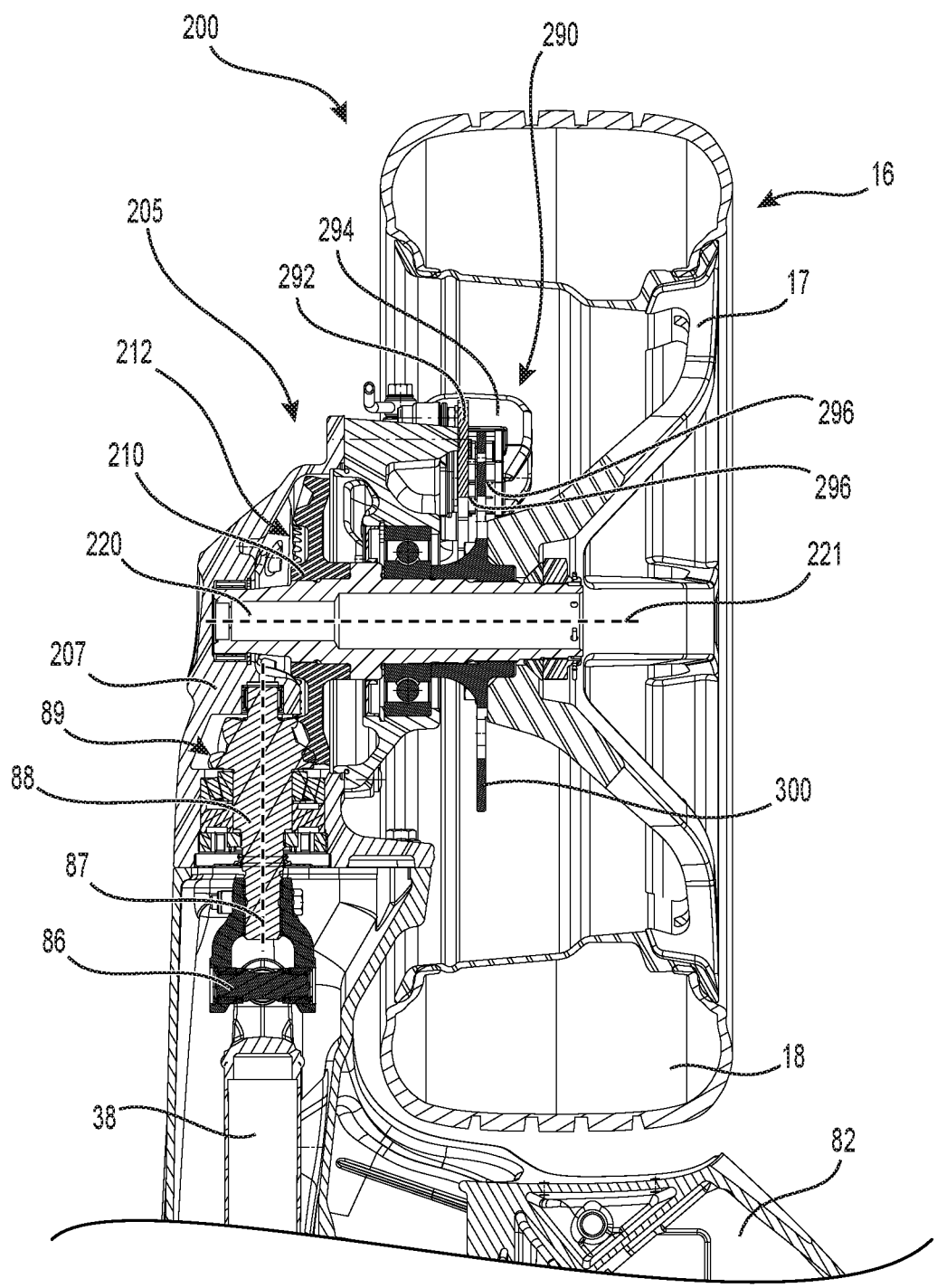
FIG. 9 is a cross-sectional view of the swing arm, wheel, wheel hub assembly, and driveshaft of FIG. 5, taken along line 9-9 of FIG. 7.
Figure 10:
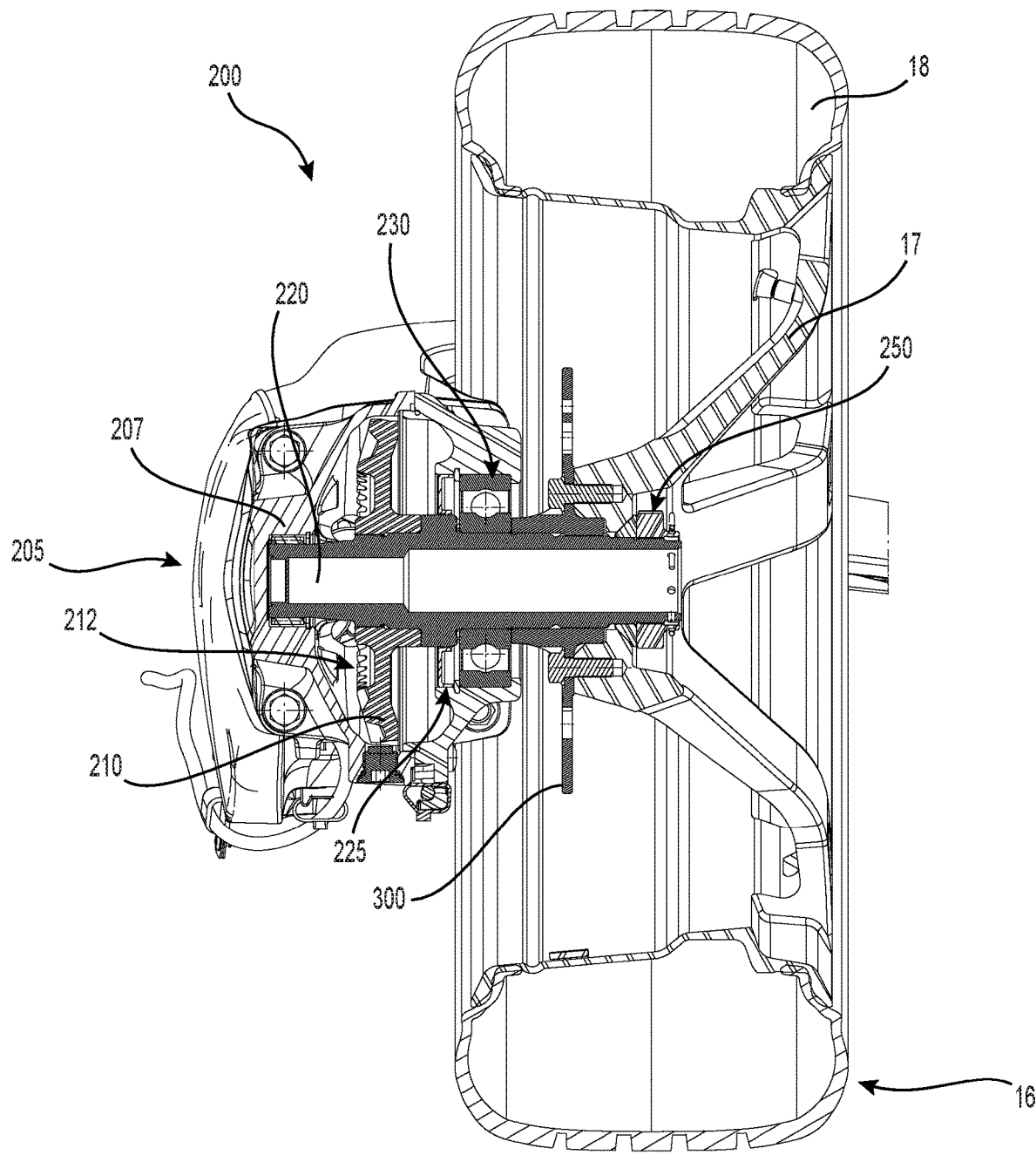
FIG. 10 is a cross-sectional view of the swing arm, wheel, and wheel hub assembly of FIG. 5, taken along line 10-10 of FIG. 8.

Rotational motion of the driveshaft 38 is transferred to the wheel 16 through a series of components of the vehicle 10, as is illustrated in cross-section in FIG. 9 and will be described briefly here. The driveshaft 38 extends partially through the swing arm 82, where the rear end thereof connects to a universal joint 86. The universal joint 86 transfers rotational motion of the driveshaft 38 to the final drive unit 205. The universal joint 86 is connected to a front end of a pinion 88 extending from the final drive unit 205. At a rear end of the pinion 88 and within the final drive unit 205, the pinion 88 drives a bevel gear 210. The gear 210 is disposed around and connected to an output shaft 220. The shaft 220 connects to the wheel 16 via an integral braking hub 300. The wheel 16 is fastened to the integral braking hub 300, which is disposed around and connected to the shaft 220. Each of these components will be described in more detail below.

The two joints 37, 86 allow the driveshaft 38 to extend through and move with the rear suspension system 80 during operation of the vehicle 10. It is contemplated that a different arrangement of shafts and joints could be utilized, depending on the particular implementation.

The pinion 88 is disposed in the swing arm 82, and more specifically within the final drive unit housing 207. The pinion 88 is connected at its forward end to the universal joint 86. On a rearward portion of the pinion 88, the pinion 88 includes a plurality of teeth 89 disposed about a rotation axis 87 of the pinion 88. The pinion 88 engages the bevel gear 210 of the wheel hub assembly 200. The gear 210 includes a plurality of gear teeth 212 disposed about a rotation axis 221 of the gear 210. The gear teeth 212 engage with the teeth 89 of the pinion 88. The gear 210 also includes internal splines 214 for engaging the shaft 220, as will be described in more detail below. The rotation axis 87 of the pinion 88 is perpendicular to the rotation axis 221 of the bevel gear 210.

Figure 11:
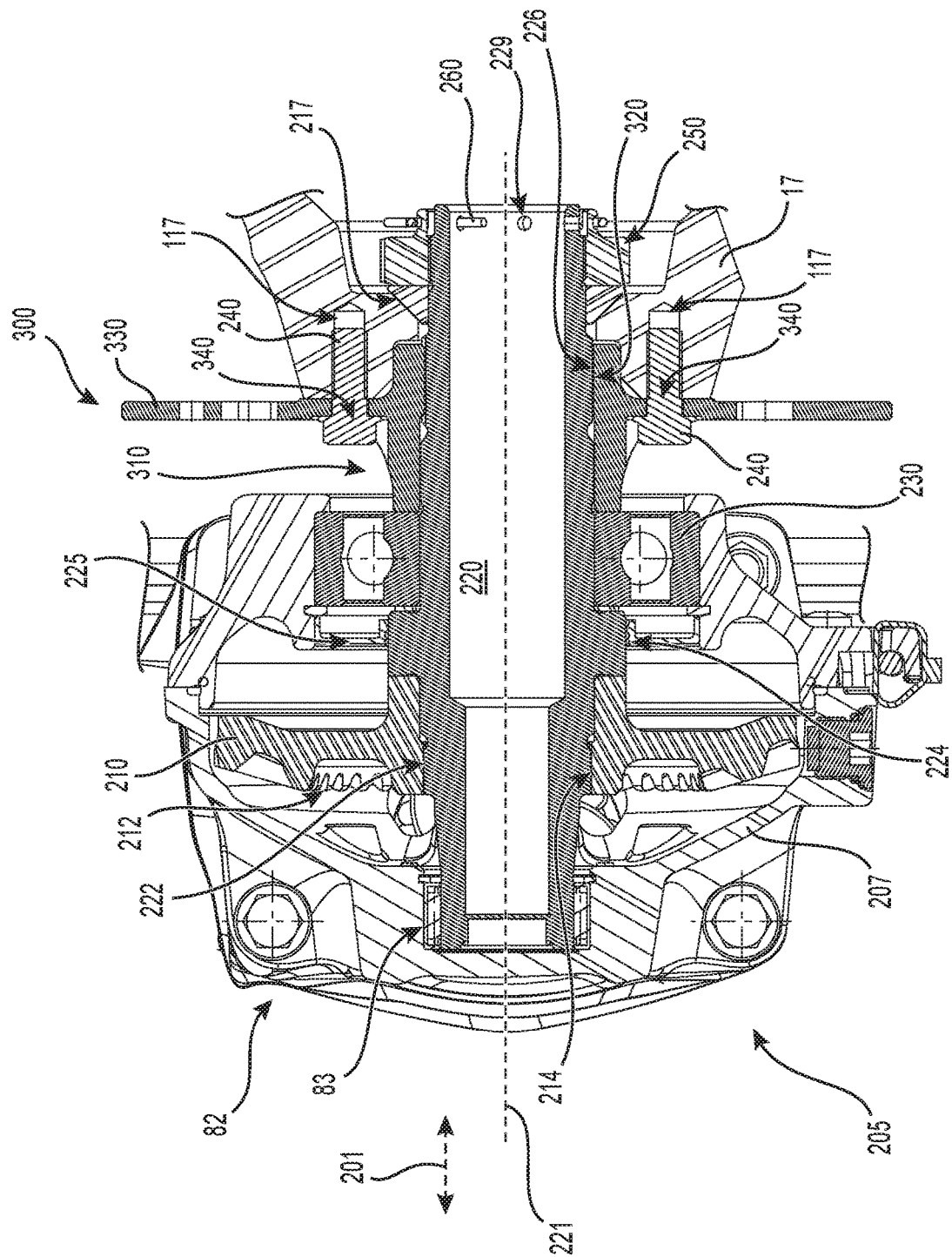
FIG. 11 is a close-up, partial view of the cross-sectional view of the swing arm and wheel hub assembly of FIG. 10.
Figure 12:
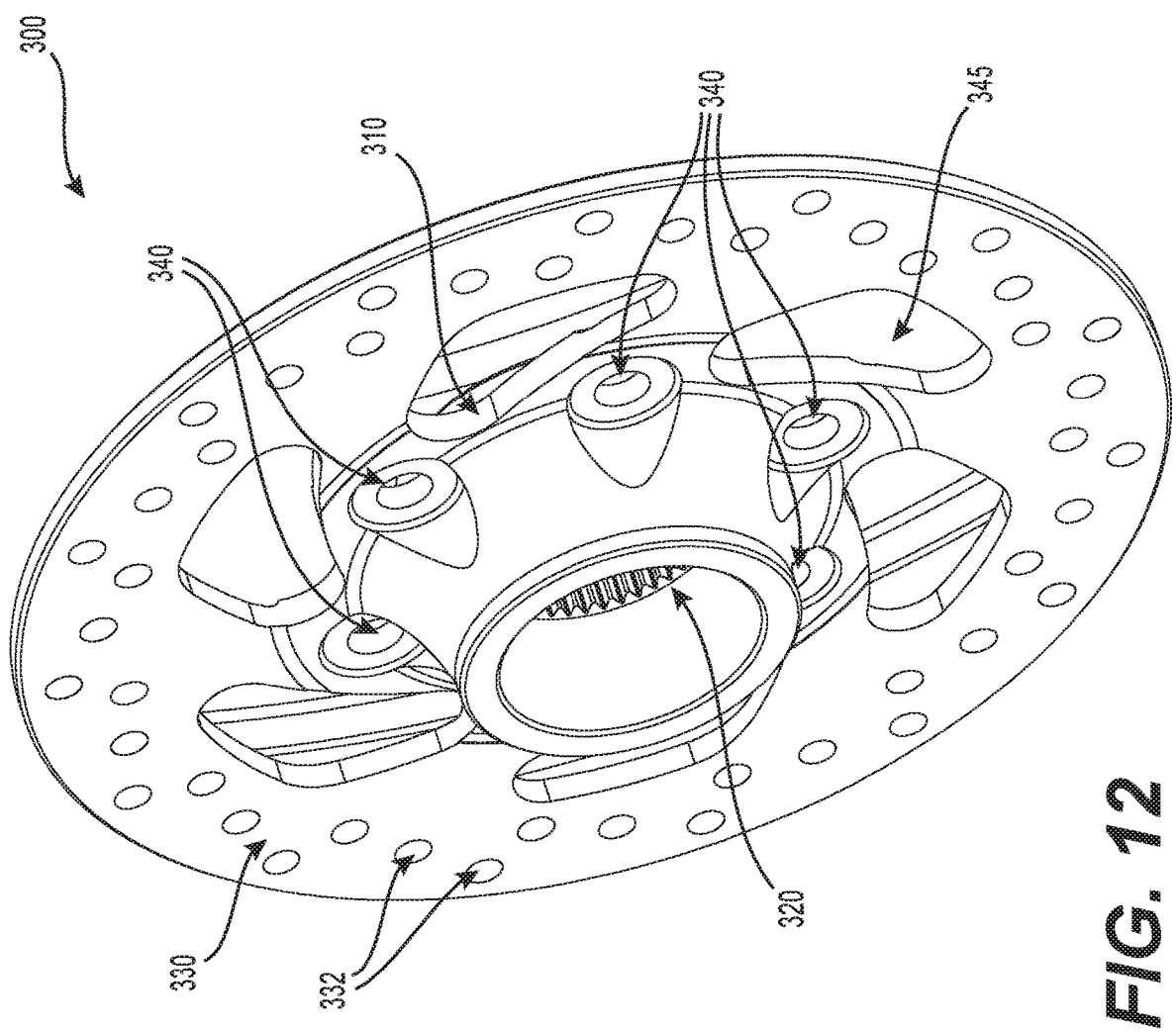
FIG. 12 is a rear, left side perspective view of an integral braking hub of the wheel hub assembly of the swing arm of FIG. 5.

The output shaft 220 of the wheel hub assembly 200 is illustrated in cross-section and enlarged in FIG. 11. The shaft 220 rotates about the longitudinal rotation axis 221, the axis 221 also defining an axial direction 201 of the shaft 220. A left end of the shaft 220 is received in a bearing 83 of the swing arm 82, which allows the shaft 220 to rotate while aiding in maintaining proper alignment of the shaft 220. The bearing 83 is a needle bearing, although it is contemplated that the bearing 83 could be replaced with another type of bearing or omitted in some implementations.

The shaft 220 includes a splined portion 222, which has a plurality of external splines for engaging the internal splines of the gear 210. As such, rotational motion of the gear 210, driven by the pinion 88, in turn drives the shaft 220 to rotate about the rotation axis 221. It is contemplated that the splined portion 222 could be omitted in some implementations, where the gear 210 is differently connected to the shaft 220, such as by key and keyway, or by welding. It is also contemplated that the shaft 220 could directly form the gear teeth 212 for engaging with the pinion 88.

Figure 13:
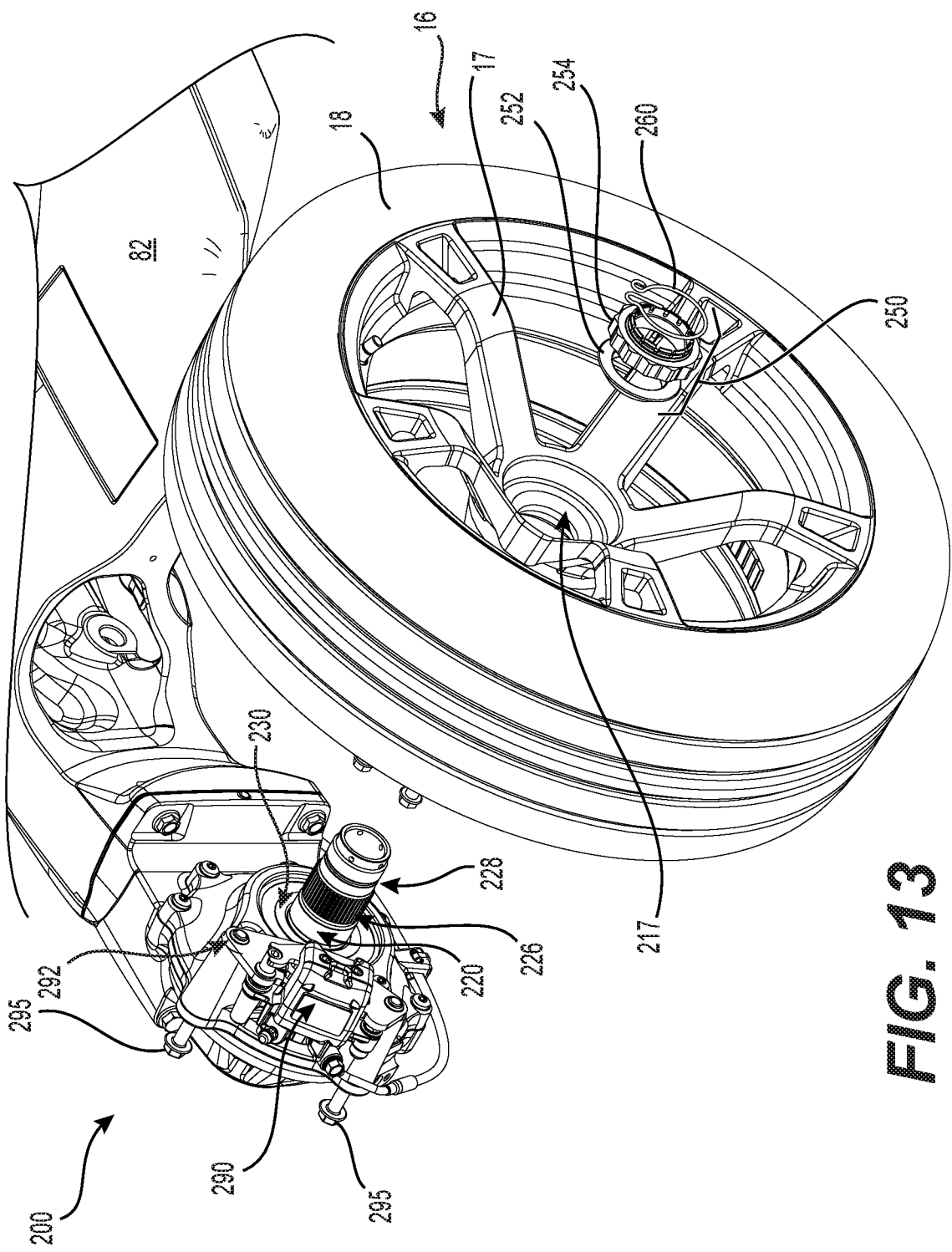
FIG. 13 is an exploded, rear, right side perspective view of the swing arm, wheel, and wheel hub assembly of FIG. 6.

Rightward of the splined portion 222, the wheel hub assembly 200 includes a bearing 230 disposed around the shaft 220 for rotationally supporting the shaft 220. The bearing 230 generally forms the last surface through which the shaft 220 extends before extending out of the swing arm 82. As can be seen in FIG. 13, portions of the shaft 220 to the right of the bearing 230 extend out of the swing arm 82, and are exposed when the wheel 16 and the integral braking hub 300 are removed from the vehicle 10. In some implementations, there may be additional components supporting the shaft 220 in the swing arm 82. It is also contemplated that the bearing 230 may be replaced or omitted, depending on the particular implementation.

A flange 224 of the shaft 220 disposed between the splined portion 222 and the bearing 230 in the axial direction 201 aids in maintaining the shaft 220 in place in the swing arm 82. The flange 224 forms the largest external diameter of the shaft 220, where the external diameter at the flange 224 is greater than the external diameter elsewhere along the shaft 220. As the shaft 220 is larger between the gear 210 and the bearing 230, the shaft 220 is generally prevented from sliding in the axial direction 201. An outer surface of the flange 224 receives a seal 225 that extends radially outward therefrom to the final drive unit housing 207 and prevents lubricant within the final drive unit 205 from escaping.

To the right of the bearing 230 and external to the swing arm 82, the wheel hub assembly 200 includes the integral braking hub 300 removably disposed around the shaft 220. As will be described in more detail below, the rear wheel rim 17 is fastened to the integral braking hub 300. The integral braking hub 300 can be seen in isolation in FIG. 12.

The integral braking hub 300 is an integrated wheel hub and brake disc. The integral braking hub 300 acts as a wheel hub for connecting to the wheel 16 to the rotating shaft 220. The integral braking hub 300 further provides a brake disc portion 330 (described below) such that the integral braking hub 300 also acts as the brake rotor for the wheel hub assembly 220. As such, the integral braking hub 300 provides both driving torque and braking torque to the wheel 16 through a same set of fasteners. The integral braking hub 300 is made from steel forging, although it is contemplated that the integral braking hub 300 could be made of one or more different materials, including but not limited to: hardened steel, carbon composite, and ceramic composite.

The integral braking hub 300 includes a central hub portion 310 which surrounds the shaft 220. The central hub portion 310 includes internal splines 320. The shaft 220 includes a corresponding splined portion 226, which has a plurality of external splines for engaging the internal splines 320 of the integral braking hub 300.

The integral braking hub 300 also includes a brake disc portion 330 which extends radially from the central hub portion 310. The brake assembly 290 includes a base 292, a caliper 294, and brake pads 296, and acts on the brake disc portion 330 for braking the wheel 16, as will be described in more detail below. The brake disc portion 330 is integral with the central hub portion 310. The brake disc portion 330 is perforated by a plurality of holes 332 to aid in cooling of the brake disc portion 330 during braking of the vehicle 10. It is contemplated that the brake disc portion 330 could define more or fewer holes 332. It is also contemplated that the brake disc portion 330 could be solid, slotted, and/or wavy.

The central hub portion 310 also defines six through-holes 340 through which are received six fasteners 240, specifically bolts 240, to connect the integral braking hub 300 to the rim 17 of the wheel 16. It is contemplated that the central hub portion 310 could define more or fewer through-holes 330, depending on the implementation. It is also contemplated that the through-holes 340 could be defined in the brake disc portion 330, or generally between the central hub portion 310 and the brake disc portion 330. The integral braking hub 300 further defines six openings 345 for decreasing the overall weight of the integral braking hub 300, as well as to aid in cooling of the brake disc portion 330. It is contemplated that the integral braking hub 300 could define more or fewer openings 345, including no slots in some implementations.

Figure 14:
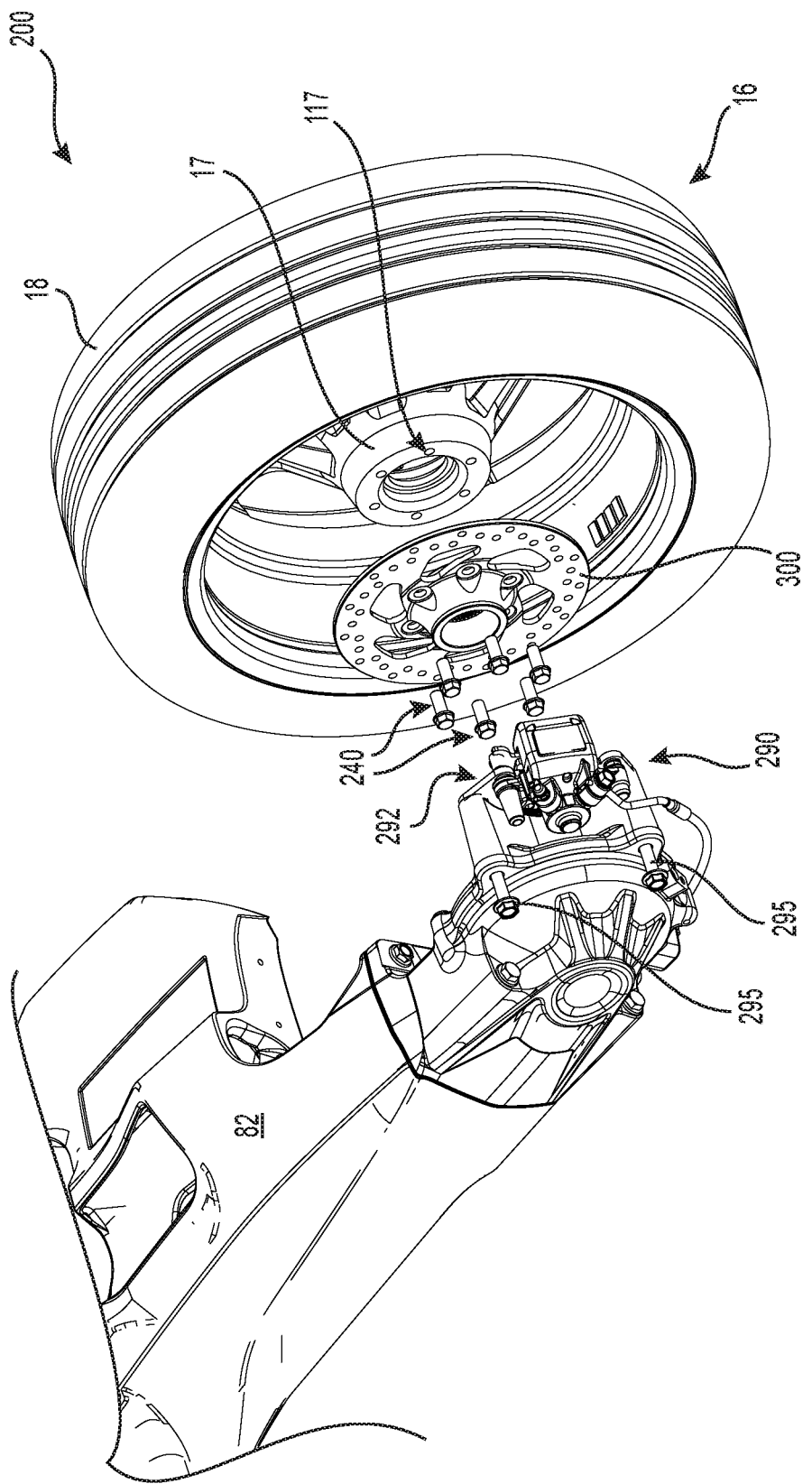
FIG. 14 is a rear, left side perspective view of the exploded swing arm, wheel, and wheel hub assembly components of FIG. 13.
Figure 15:
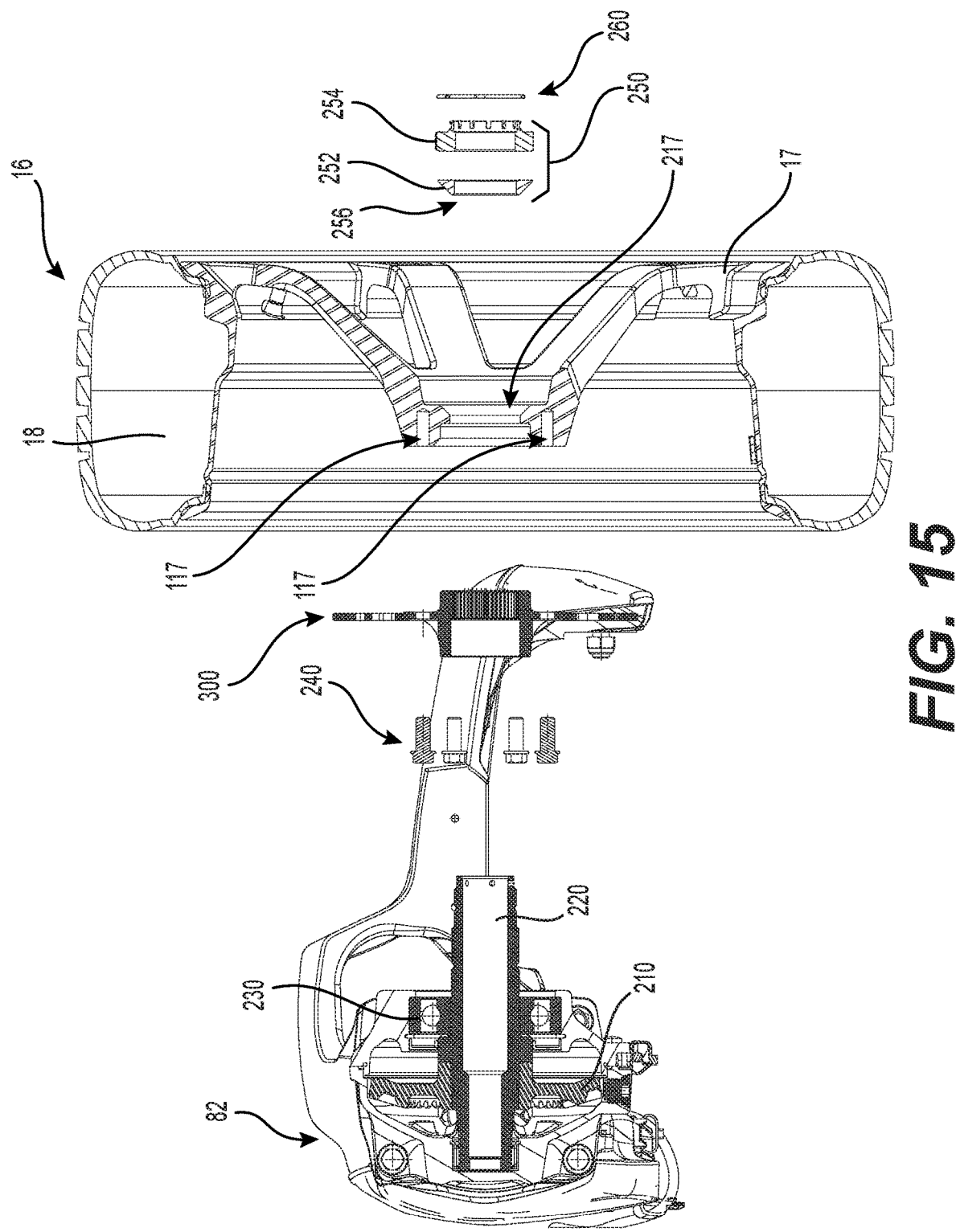
FIG. 15 is an exploded view of the cross-section of FIG. 10.

As mentioned above, the wheel 16 is fastened to the integral braking hub 300 via the through-holes 340. As can be seen in FIGS. 11, 14, and 15, the wheel rim 17 defines six tapped holes 117 for receiving the six bolts 240. The bolts 240 pass through the through-holes 340 and are screwed into the holes 117, thereby bolting the wheel 16 to the integral braking hub 300, which in turn is operatively connected to the shaft 220.

The wheel hub assembly 200 further includes a nut 250, the wheel 16 being disposed between the nut 250 and the brake disc portion 330 in the axial direction 201. The nut 250 retains the integral braking hub 300, and the wheel 16 fastened thereto, on the shaft 220. The shaft 220 includes a corresponding threaded end portion 228 on a right side end portion of the shaft 220, onto which the nut 250 is threaded.

In the illustrated implementation, the nut 250 is composed of two portions: a wheel abutting portion 252 and a threaded portion 254. In some implementations, the wheel abutting portion 252 and the threaded portion 254 could be integrally connected. On the wheel facing side of the nut 250, the nut 250 includes a frusticonical surface 256. The wheel rim 17 defines a corresponding frusticonical recess 217 in which the nut 250 is received, the nut 250 being in flush contact with the wheel rim 17. The two cooperating forms 256, 217 can be seen in at least FIG. 15.

The wheel hub assembly 200 further includes a locking member 260 which extends through the nut 250 and the shaft 220. The locking member 260, specifically a combination cotter pin and retaining ring 260, serves as a back-up to the nut 250, ensuring it remains in position on the shaft 220. The locking member 260 prevents rotational motion of the nut 250 relative to the shaft 220, which would cause the nut 250 to unfasten. The locking member 260 is disposed around the nut 250, with a portion of the locking member passing through one of a plurality of notches in the nut 250, and then through one of five through-holes 229 which are defined in the shaft 220. It is contemplated that the locking member 260 could be integrally connected to the nut 250 in some implementations. It is also contemplated that the locking member 260 could be replaced or omitted, depending on the particular implementation.

As mentioned above, the wheel hub assembly 200 also includes the brake assembly 290 for braking the wheel 16. The base 292 of the brake assembly 290 is generally shaped like a plate and serves to connect the caliper 294 to the final drive unit housing 207. It is fastened to the final drive unit 205 by two bolts 295. As can be seen in FIG. 9, the brake pads 296 are disposed on right and left sides of the integral braking hub 300, such that when the caliper 294 is moved to a closed position, each brake pad 296 applies pressure to the brake disc portion 330 of the integral braking hub 300.

Figure 20:
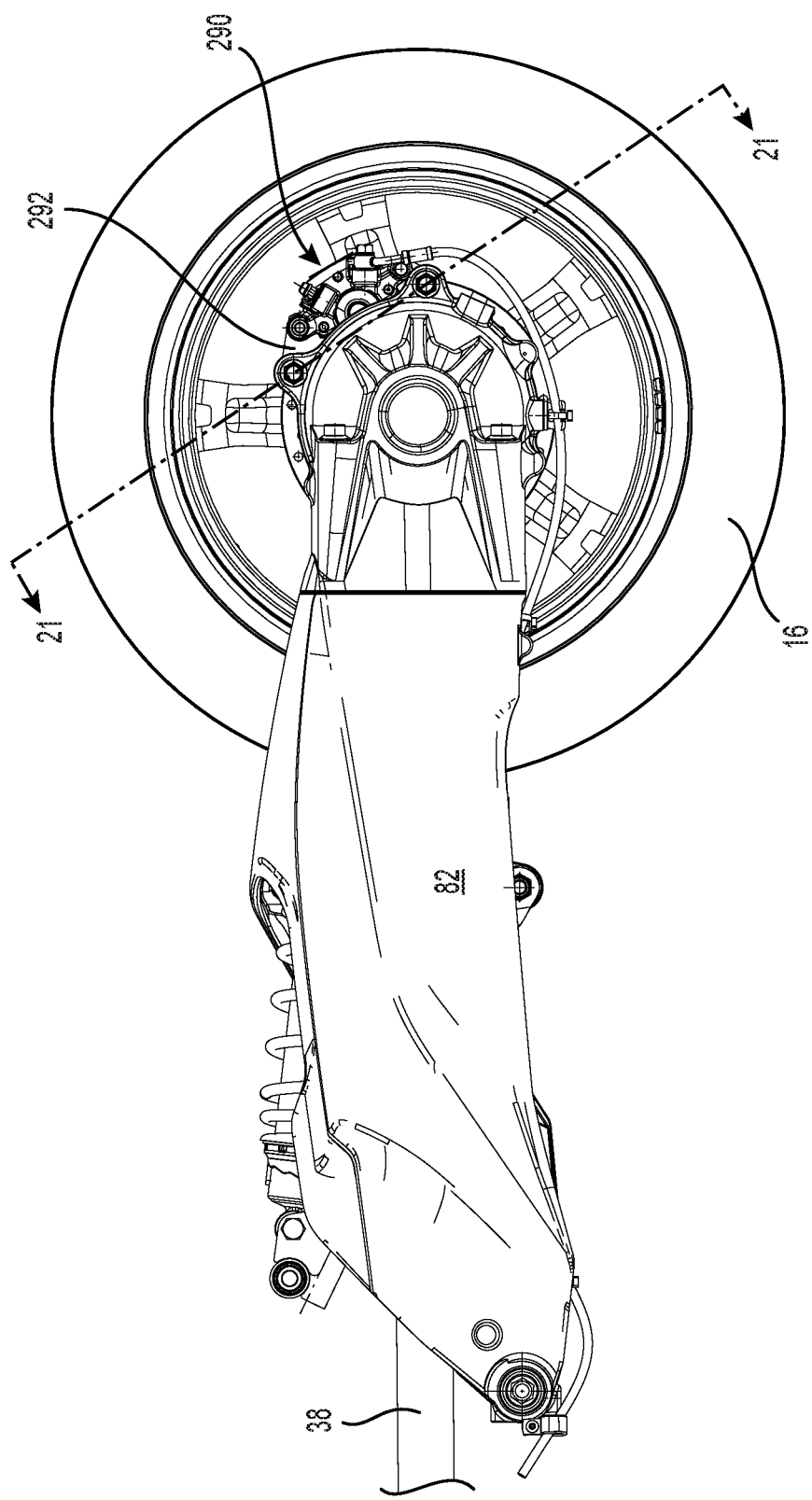
FIG. 20 is a left side elevation view of the swing arm, wheel, and wheel hub assembly of FIG. 5.
Figure 21:
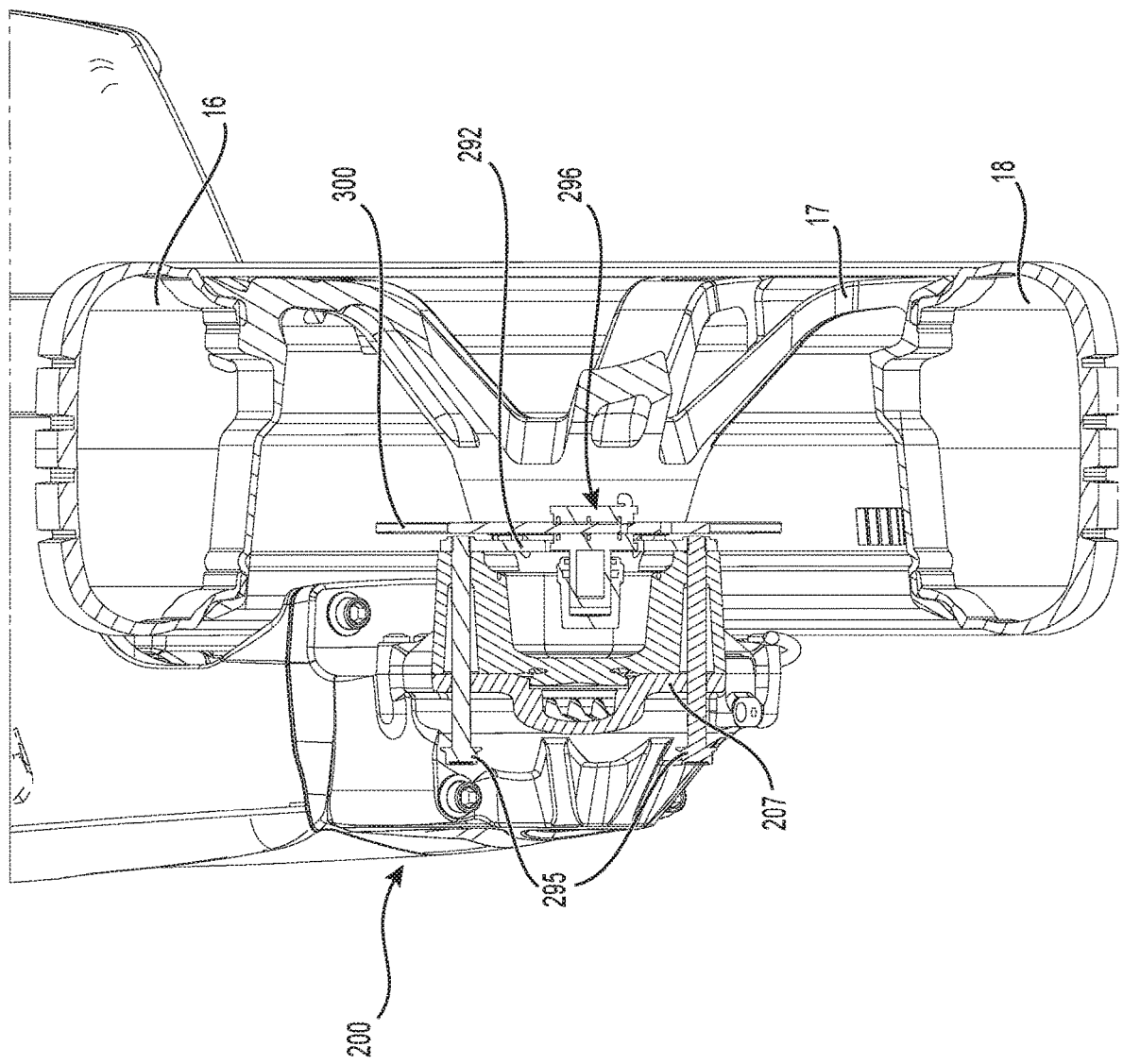
FIG. 21 is a cross-sectional view of the swing arm, wheel, and wheel hub assembly of FIG. 5, taken along line 21-21 of FIG. 20.

As will be described in more detail below, in order to remove the wheel 16 from the vehicle 10, the brake assembly 290 is rotated rearward in order to allow movement of the integral braking hub 300 in the axial direction 201. This is generally accomplished by removing the forward bolt 295 from the base 292, loosening the rear bolt 295, and then pivoting the base 292 rearward, upward, and away from the integral braking hub 300. The operating position of the caliper and brake assembly 290 is illustrated in FIG. 20, the wheel 16 and the integral braking hub 300 not being depicted for clarity. In FIG. 21, the caliper and brake assembly 290 is shown in the pivoted position.

Figure 16:
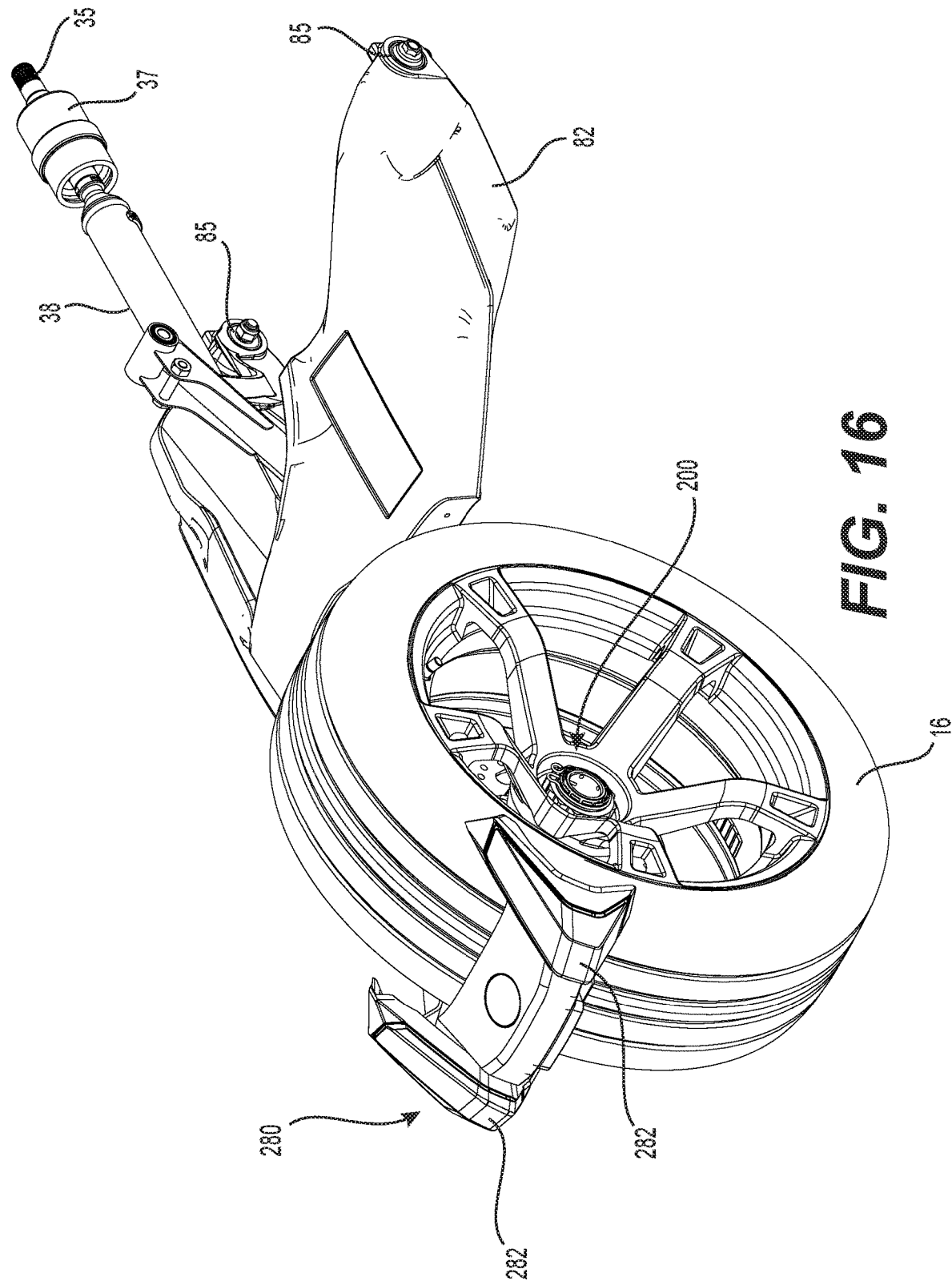
FIG. 16 is a rear, right side perspective view of the swing arm, wheel, and driveshaft of FIG. 5, with a rear fender connected thereto.
Figure 17:
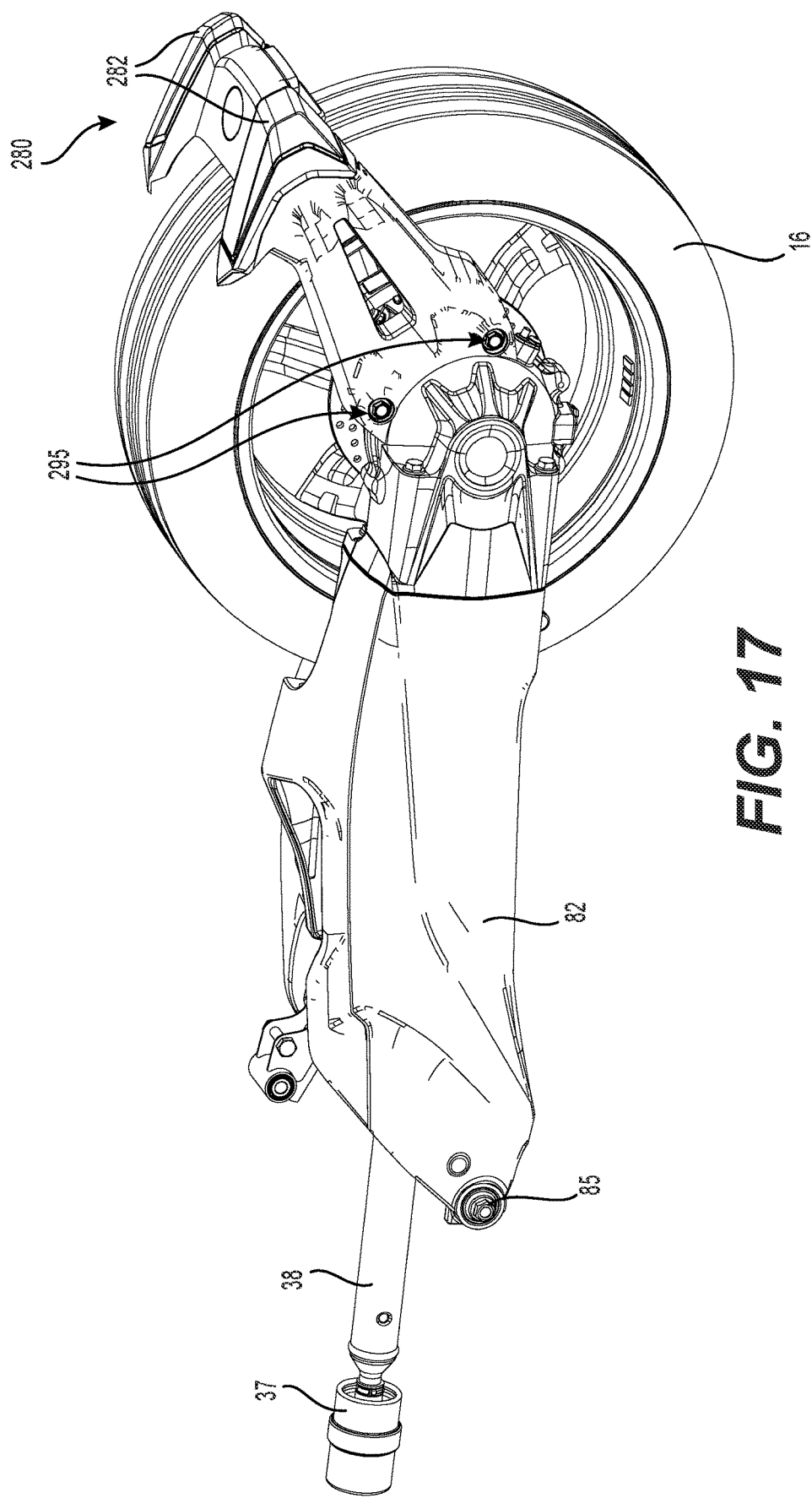
FIG. 17 is a rear, left side perspective view of the swing arm, driveshaft, wheel, and rear fender of FIG. 16.
Figure 18:
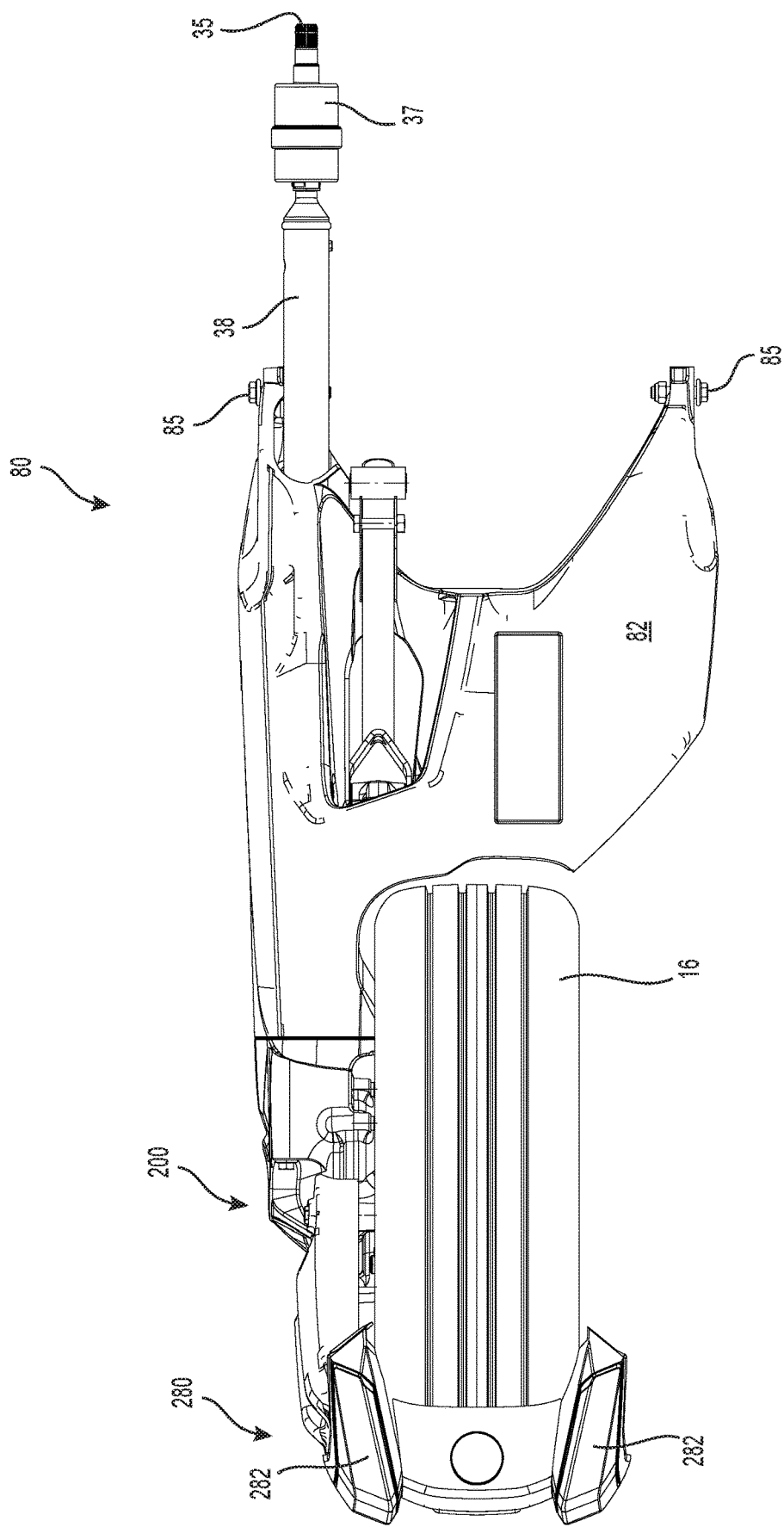
FIG. 18 is a top plan view of the swing arm, driveshaft, wheel, and rear fender of FIG. 16.

As is illustrated in FIGS. 16 to 18, some implementations of the vehicle 10 include a rear fender assembly 280. The rear fender assembly 280 includes two rear lights 282. The rear fender 280 extends rearward from the swing arm 82, and then rightward to extend behind the wheel 16, the rear fender 280 being connected to the swing arm 82 only on the left side of the vehicle 10. As can be seen in FIG. 17, the rear fender 280 is fastened to the swing arm 82 by the two bolts 295 which also fasten the brake assembly 290 to the swing arm 82.

Figure 19:
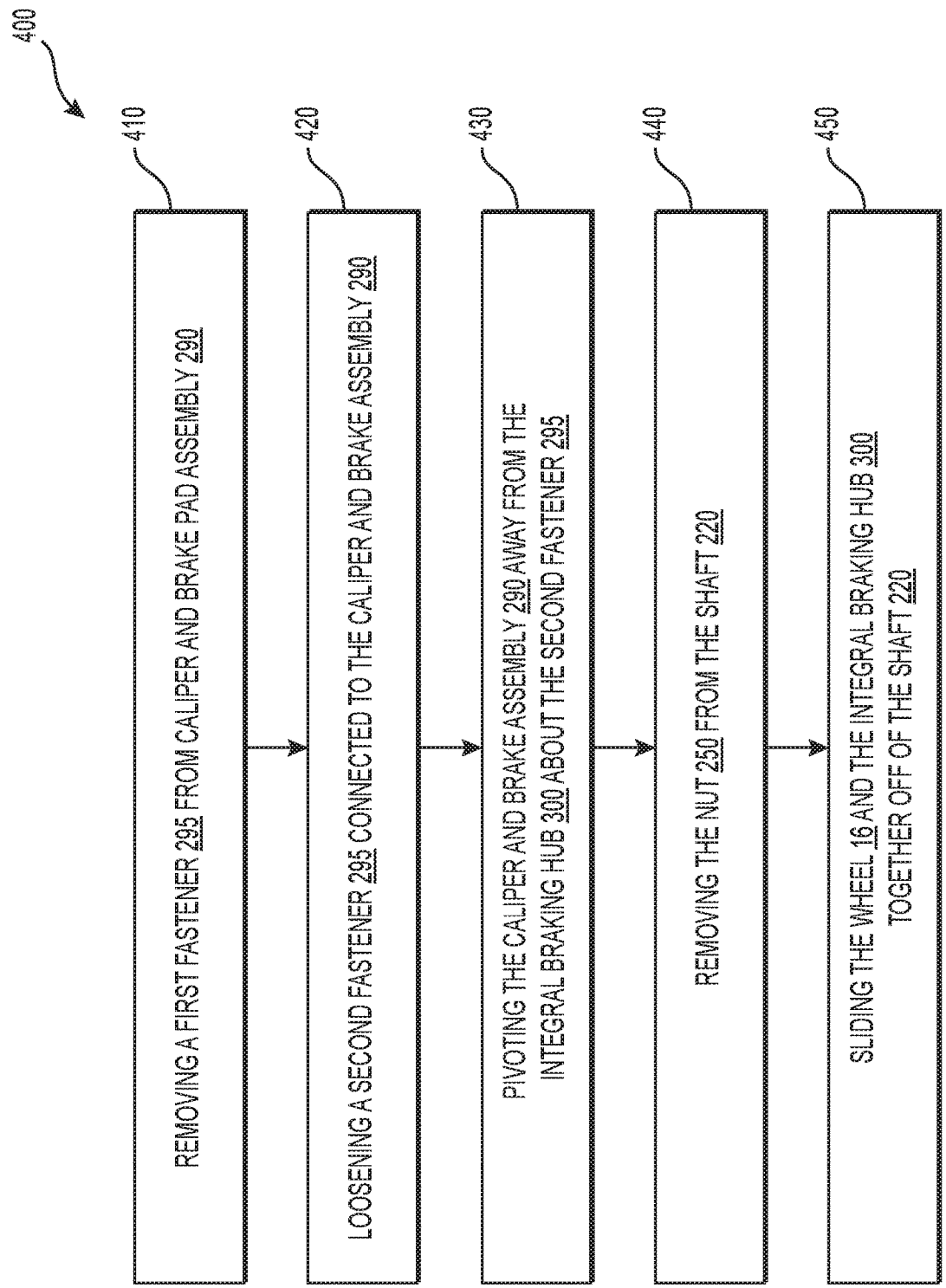
FIG. 19 is a schematic flow chart of a method of removing a wheel from the swing arm of FIG. 5.

With reference to FIGS. 19 to 25, a method 400 of removing the wheel 16 from the vehicle 10 will now be described. A schematic flowchart of the method 400 is illustrated in FIG. 19.

In order to remove the wheel 16 from the vehicle 10, there are two general impediments to axial movement of the wheel 16 to be removed: the brake assembly 290 disposed around the brake disc portion 330 of the integral braking hub 300, and the nut 250 disposed adjacent the wheel rim 17. The method 400 as described covers generally disengaging first the brake assembly 290 from the brake disc portion 330, and then subsequently removing the nut 250. It is contemplated that the nut 250 could be removed before the caliper and brake pad assembly 290 in some implementations.

Prior to the start of the method 400 for removing the wheel 16, the brake assembly 290 is secured to the final drive unit housing 207 by two bolts 295, as mentioned above. This is further illustrated in FIGS. 20 and 21, where the two bolts 295 extend through the final drive unit housing 207 and into the base 292. The method 400 begins by unscrewing the forward bolt 295 such that it is sufficiently withdrawn into the final drive unit housing 207 that it clears the brake assembly 290 at step 410. See, for example, FIG. 22, where the forward bolt 295 is shown above the rearward bolt 295. Alternatively, the forward bolt 295 could be removed entirely from the final drive unit housing 207.

Figure 22:
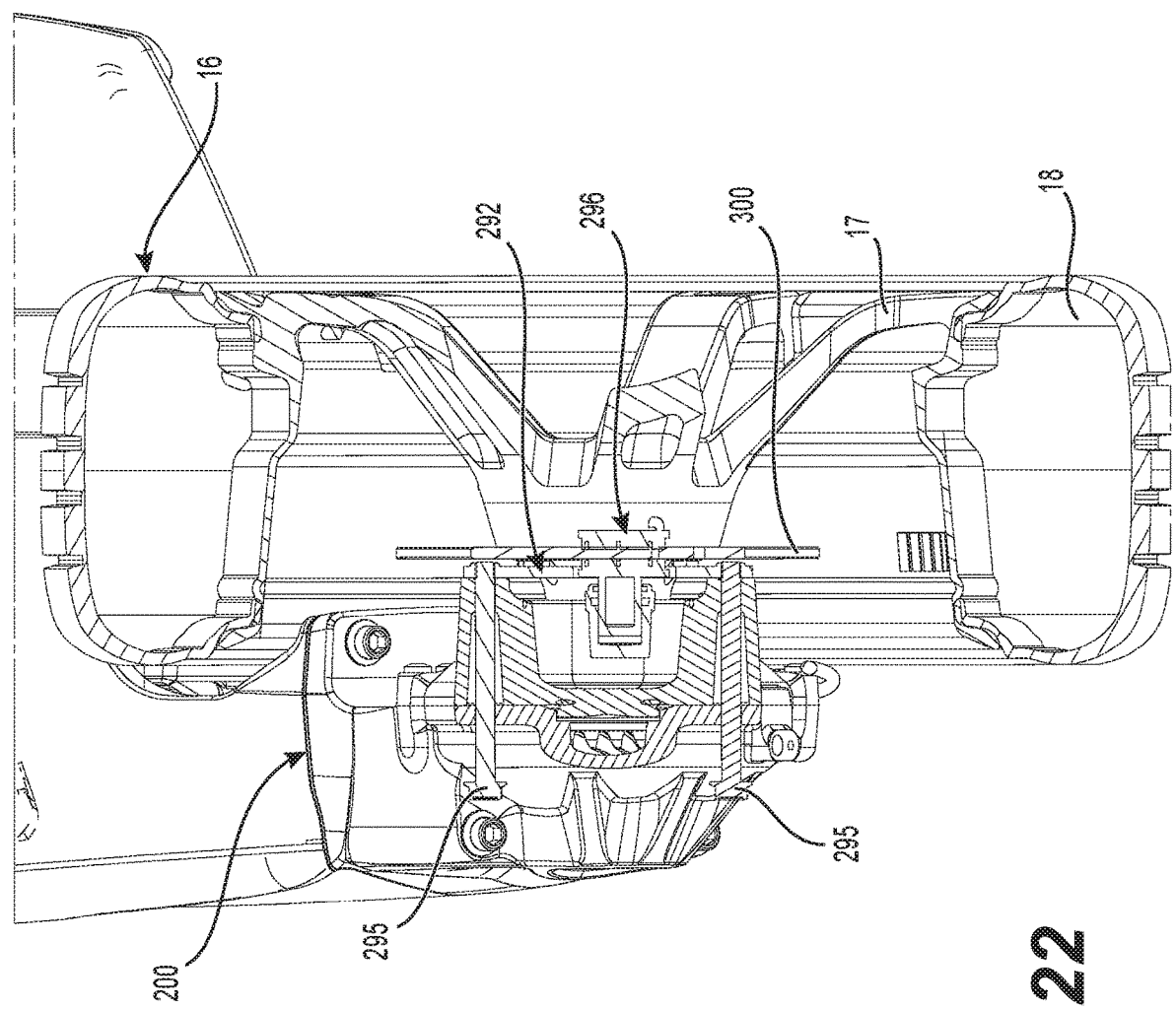
FIG. 22 is the cross-sectional view of FIG. 21, with one bolt unscrewed from a brake assembly.
Figure 23:
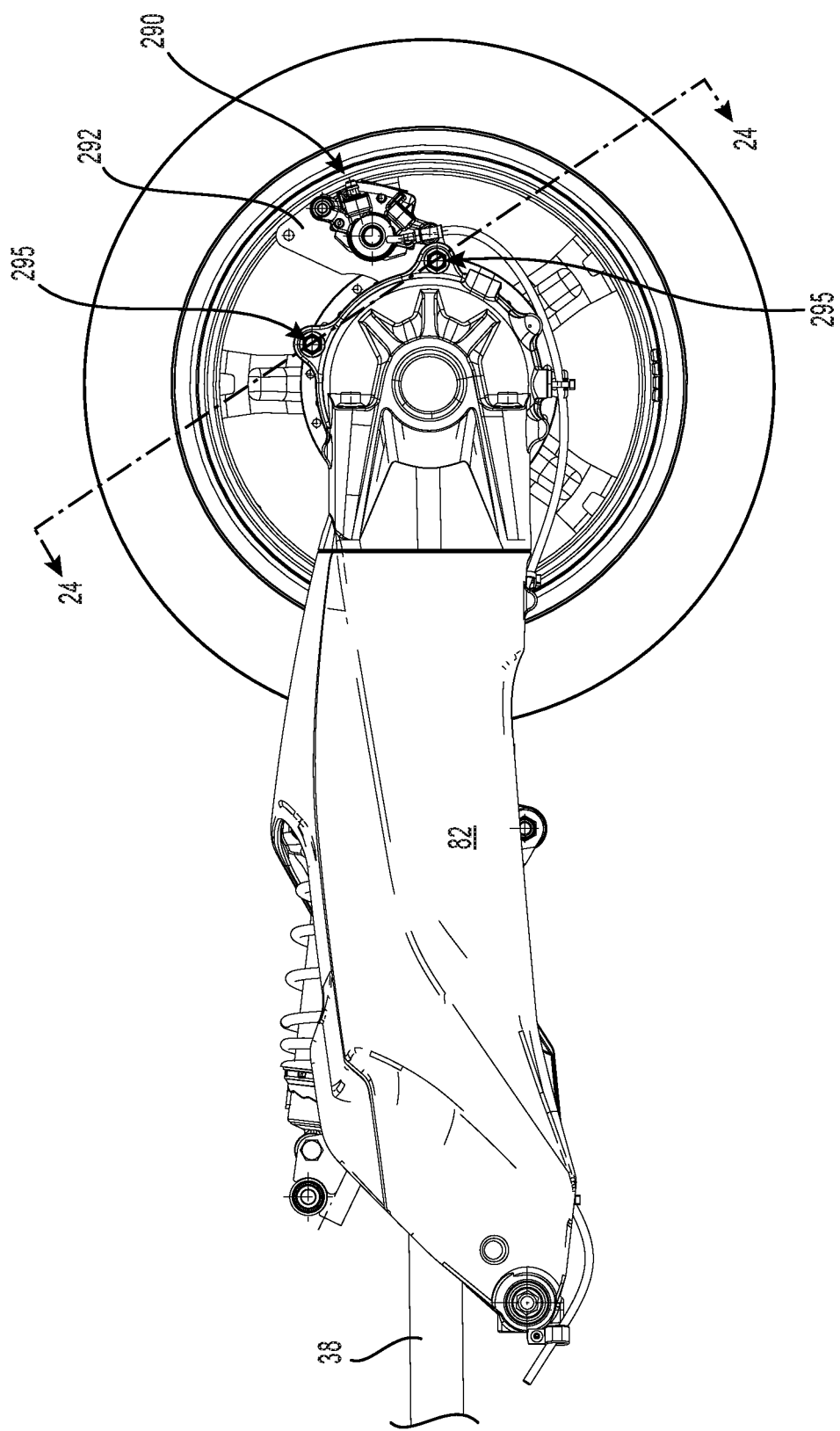
FIG. 23 is the left side elevation view of FIG. 20, with the brake assembly in a pivoted position.
Figure 24:
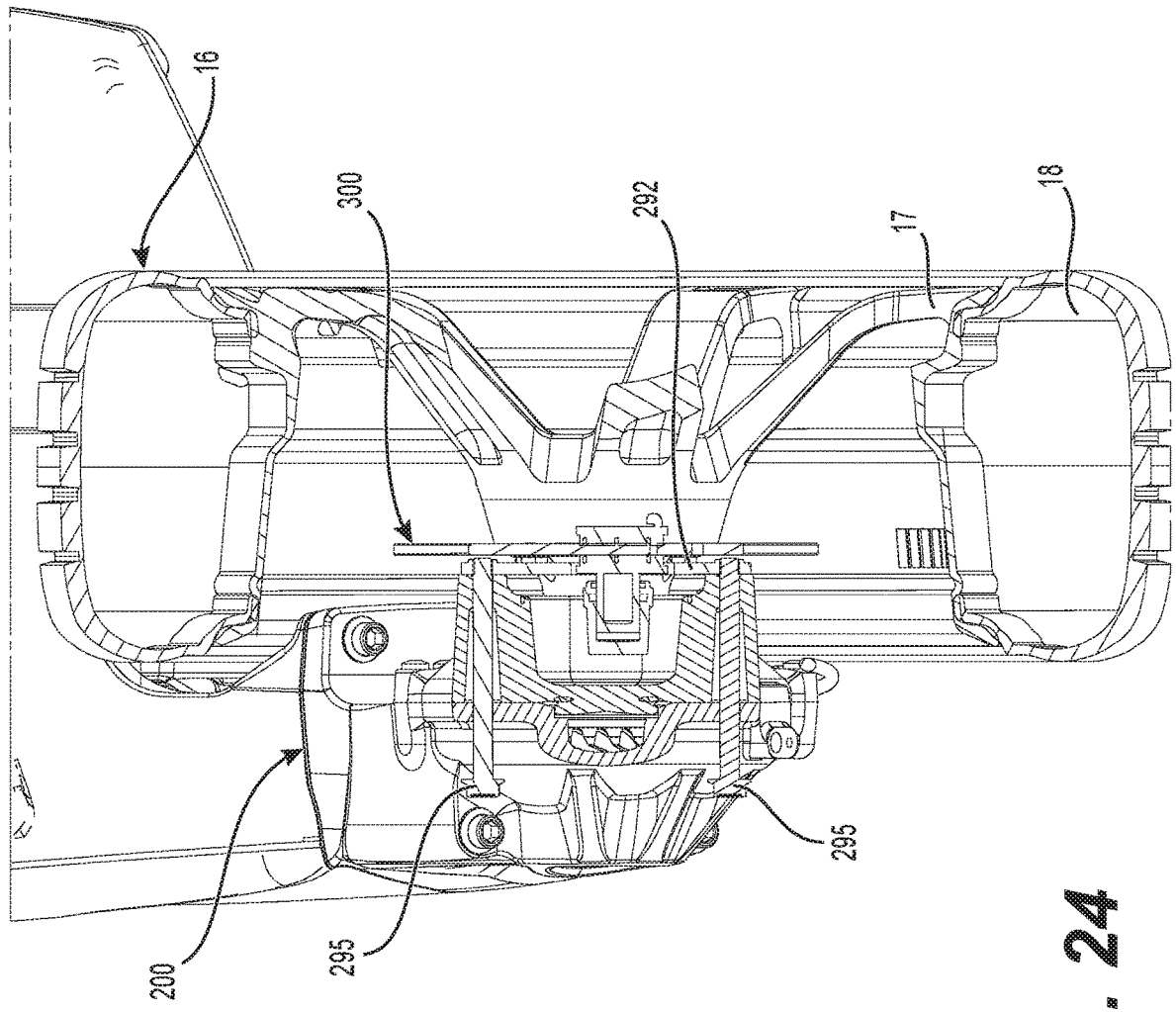
FIG. 24 is a cross-sectional view of the swing arm, wheel, and wheel hub assembly of FIG. 23, taken along line 24-24 of FIG. 23.
Figure 25:
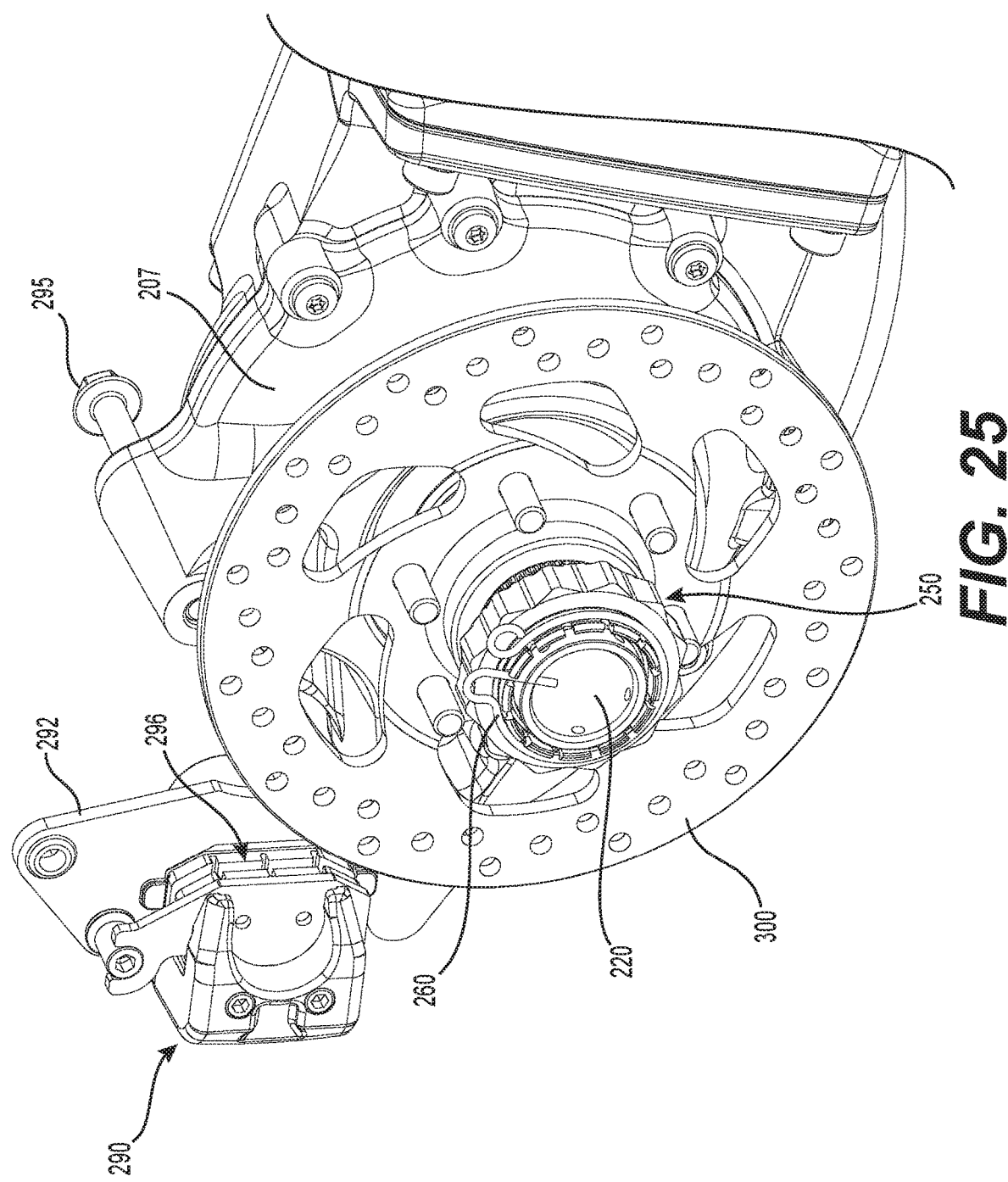
FIG. 25 is a close-up, front, right side perspective view of the swing arm and wheel hub assembly of FIG. 5, with the wheel having been removed.

Next, the method 400 continues with loosening the rearward bolt 295 connected to the brake assembly 290 at step 420. This loosening reduces the clamping force exerted on the final drive unit housing 207 by the rearward bolt 295 and the base 292 to a sufficient degree that the rearward bolt 295 is not compressing the final drive unit housing 207 enough to prevent movement of the brake assembly 290. At this step, the brake assembly 290 is still in the operating position as illustrated in FIGS. 20 to 22.

At step 430, the method 400 continues with pivoting the brake assembly 290 away from the integral braking hub 300, the brake assembly 290 pivoting about the rearward bolt 295. A front portion of the brake assembly 290 is pivoted generally upward and rearward, such that the caliper and brake pads 294, 296 are drawn away from the brake disc portion 330. The brake assembly 290 is illustrated in the pivoted position in FIGS. 23 to 25.

In some implementations, the brake assembly 290 could be disposed around an upper, front portion of the brake disc portion 330, rather than the upper, rear portion of the illustrated implementation. In such a case, the rear bolt 295 could be removed from the assembly housing 292, and the brake assembly 290 could be pivoted upward and forward, about the forward bolt 295. It is also contemplated that the brake assembly 290 could be disposed in an other, different orientation with respect to the integral braking hub 300, and the bolt 295 to be removed or pivoted about could change in consequence. It is further contemplated that both bolts 295 could be completely removed in order to completely remove the brake assembly 290.

The method 400 continues by removing the nut 250 from the shaft 220 at step 440. To remove the nut 250, the locking member 260 is first removed from the nut 250 and the shaft 220. The threaded portion 254 is then unscrewed from the shaft 220. The wheel abutting portion 252 is subsequently removed from the shaft 220. In some situations, the wheel abutting portion 252 could be left on the shaft 220 at this step, where subsequent removal of the wheel 16 could simultaneously remove the portion 252 as well. For implementations where the nut 250 is one piece, both the threaded portion 254 and the wheel abutting portion 252 would be removed from the shaft 220 simultaneously.

Finally, the method 400 terminates, at step 450, with sliding the wheel 16 and the integral braking hub 300 together off of the shaft 220 in the axial direction 201.

It is contemplated that the method 400 could include additional or different steps, either to perform additional functions and/or to perform the steps described above. It is also contemplated that the steps 410, 420, 430, and 440 could be performed in an assortment of different sequences, depending on for example user preferences, and is not limited to the order set forth in the explanation above.

The vehicle 10, the wheel hub assembly 200, and the method 400 implemented in accordance with some non-limiting implementations of the present technology can be represented as presented in the following numbered clauses.

CLAUSE 1: A wheel hub assembly (200) for a vehicle (10), the wheel hub assembly (200) comprising a shaft (220) adapted for operatively connecting to a motor (30) of the vehicle (10), the shaft (220) including: a threaded end portion (228), and a splined portion (226) including a plurality of external splines; an integral braking hub (300)

disposed on and connected to the shaft (220), the integral braking hub (300) including a central hub portion (310) including a plurality of internal splines (320) engaging the plurality of external splines of the splined portion (226) of the shaft (220), and a brake disc portion (330) extending radially from the central hub portion (310), the brake disc portion (330) being integral with the central hub portion (310), at least one of the central hub portion (310) and the brake disc portion (330) defining a plurality of through-holes (340); a wheel (16) fastened to the integral braking hub (300) by a plurality of fasteners (240), each one of the plurality of fasteners (240) passing through a corresponding one of the plurality of through-holes (340); and a nut (250) fastened to the threaded end portion (228) of the shaft (220), the wheel (16) being disposed between the nut (250) and the brake disc portion (330) in an axial direction (201) of the shaft (220).

CLAUSE 2: The wheel hub assembly (200) of clause 1, wherein: the wheel (16) includes: a rim (17), and a tire (18) mounted on the rim (17); the nut (250) has a frustoconical surface (256) on a wheel facing side of the nut (250); and the rim (17) has a corresponding frustoconical recess (217) for receiving the nut (250).

CLAUSE 3: The wheel hub assembly (200) of clause 1 or 2, further comprising a locking member (260) extending at least partially through the nut (250) and the shaft (220).

CLAUSE 4: The wheel hub assembly (200) of any one of clauses 1 to 3, wherein: the splined portion (226) of the shaft (220) is a first splined portion (226); the plurality of external splines is a first plurality of external splines; the shaft (220) further includes a second splined portion (222), the second splined portion (222) including a second plurality of external splines; and the first splined portion (226) and the second splined portion (222) are spaced apart in the axial direction (201).

CLAUSE 5: The wheel hub assembly (200) of clause 4, further comprising a gear (210) disposed on the shaft (220), the gear (210) defining a plurality of internal gear splines (214) engaging the second plurality of external splines of the second splined portion (222), the gear (210) being adapted for operatively connecting the shaft (220) to the motor (30) of the vehicle (10).

CLAUSE 6: The wheel hub assembly (200) of clause 4 or 5, further comprising at least one bearing (230) disposed around the shaft (220) for rotationally supporting the shaft (220) on the vehicle (10), the at least one bearing (230) being disposed between the first splined portion (226) and the second splined portion (222) in the axial direction (201).

CLAUSE 7: The wheel hub assembly (200) of clause 6, wherein a largest diameter of the shaft (220) is disposed between the at least one bearing (230) and the second splined (226) portion in the axial direction (201).

CLAUSE 8: The wheel hub assembly (200) of any one of clauses 1 to 7, further comprising a caliper and brake pad assembly (290) for engaging with the brake disc portion (330) of the integral braking hub (300) for braking the wheel (16), the caliper and brake pad assembly (290) being adapted for connecting to a rear suspension system (80) of the vehicle (10).

CLAUSE 9: A vehicle (10) comprising a frame (12); at least one front suspension system (70) connected to the frame (12); at least one front ground engaging member (14), the at least one ground engaging member (14) being operatively connected to the at least one front suspension system (70); at least one seat (20) connected to and supported by the frame (12); a motor (30) connected to and supported by the frame (12); a rear suspension system (80) connected to the frame (12); a wheel hub assembly (200) connected to the rear suspension system (80), the wheel hub assembly (200) including: a shaft (220) operatively connected to the motor (30), the shaft (220) including: a threaded end portion (228), and a splined portion (226) including a plurality of external splines; an integral braking hub (300) disposed on and connected to the shaft (220), the integral braking hub (300) including: a central hub portion (310) including a plurality of internal splines (320) engaging the plurality of external splines of the splined portion (226) of the shaft (220), and a brake disc portion (330) extending radially from the central hub portion (310), the brake disc portion (330) being integral with the central hub portion (310), at least one of the central hub portion (310) and the brake disc portion (330) defining a plurality of through-holes (340); a wheel (16) fastened to the integral braking hub (300) by a plurality of fasteners (240), each one of the plurality of fasteners (240) passing through a corresponding one of the plurality of through-holes (340); and a nut (250) fastened to the threaded end portion (228) of the shaft (220), the wheel (16) being disposed between the nut (250) and the brake disc portion (330) in an axial direction (201) of the shaft (220).

CLAUSE 10: The vehicle (10) of clause 9, wherein: the splined portion (226) of the shaft (220) is a first splined portion (226); the plurality of external splines is a first plurality of external splines; the shaft (220) further includes a second splined portion (222), the second splined portion (222) including a second plurality of external splines; and the first splined portion (226) and the second splined portion (222) are spaced apart in the axial direction (201).

CLAUSE 11: The vehicle (10) of clause 10, further comprising: a gear (210) disposed on the shaft (220), the gear (210) including a plurality of gear teeth (212), and a plurality of internal gear splines (214) engaging the second plurality of external splines of the second splined portion (222); a driveshaft (38) disposed at least in part in the rear suspension system (80), a first end of the driveshaft (38) being pivotably and operatively connected to the motor (30); and a pinion (88) operatively connected to a second end of the driveshaft (38), the pinion (88) including a plurality of teeth (89), the plurality of teeth (89) of the pinion (88) engaging the plurality of gear teeth (212) of the gear (210) to drive the shaft (220).

CLAUSE 12: The vehicle (10) of clause 10 or 11, further comprising at least one bearing (230) disposed around the shaft (220) for rotationally supporting the shaft (220), the at least one bearing (230) being disposed between the first splined portion (226) and the second splined portion (222) in the axial direction (201).

CLAUSE 13: The vehicle (10) of any one of clauses 9 to 12, further comprising a caliper and brake pad assembly (290) for engaging with the brake disc portion (330) of the integral braking hub (300) for braking the wheel (16), the caliper and brake pad assembly (290) being connected to the rear suspension system (80).

CLAUSE 14: The vehicle (10) of clause 13, wherein the caliper and brake pad assembly (290) is connected to the rear suspension system (80) via two bolts (295); and the caliper and brake pad assembly (290) can be pivoted away from the integral braking hub (300) about one of the two bolts (295) when an other one of the two bolts (295) is removed from the caliper and brake pad assembly (290).

CLAUSE 15: The vehicle (10) of clause 14, wherein the wheel (16) is removable from the rear suspension system (80) when the caliper and brake pad assembly (290) is pivoted away from the integral braking hub (300), and the nut (250) is removed from the shaft (220); and the wheel (16) and the integral braking hub (300) are removed from the vehicle (10) together by sliding the wheel (16) along the shaft (220) and away from the rear suspension system (80).

CLAUSE 16: The vehicle (10) of any one of clauses 9 to 15, wherein the rear suspension system (80) includes a swing arm (82) pivotably connected to the frame (12), the wheel hub assembly (200) being connected to a rear end portion of the swing arm (82).

CLAUSE 17: The vehicle (10) of any one of clauses 9 to 16, wherein the wheel (16) includes: a rim (17), and a tire (18) mounted on the rim (17); the nut (250) has a frustoconical surface (256) on a wheel facing side of the nut (250); and the rim (17) has a corresponding frustoconical recess (217) for receiving the nut (250).

CLAUSE 18: The vehicle (10) of any one of clauses 9 to 17, further comprising a locking member (260) extending at least partially through the nut (250) and the shaft (220).

CLAUSE 19: The vehicle (10) of any one of clauses 9 to 18, further comprising a rear fender assembly (280) connected to the rear suspension system (80), the rear fender assembly (280) extending at least partially behind the wheel (16).

CLAUSE 20: The vehicle (10) of any one of clauses 9 to 19, wherein the at least one front suspension system (70) is a left front suspension system (70) and a right front suspension system (70); and the at least one front ground engaging member (14) is a left front wheel (14) connected to the left front suspension system (70) and a right front wheel (14) connected to the right front suspension system (70).

CLAUSE 21. A method (400) for removing a wheel (16) from a vehicle (10), the wheel (16) being disposed on a shaft (220) between a nut (250) fastened to a shaft (220) and an integral braking hub (300) fastened to the wheel (16), the method comprising removing (410) a first fastener (295) from a caliper and brake pad assembly (290), the caliper and brake pad assembly (290) being disposed at least in part over a brake disc portion (330) of the integral braking hub (300); loosening (420) a second fastener (295) connected to the caliper and brake pad assembly (290); pivoting (430) the caliper and brake pad assembly (290) away from the integral braking hub (300) about the second fastener (295); removing (440) the nut (250) from the shaft (220); and sliding (450) the wheel (16) and the integral braking hub (300) together off of the shaft (220) once the nut (250) is removed and the caliper and brake pad assembly (290) is pivoted away from the integral braking hub (300).

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A wheel hub assembly for a vehicle, the wheel hub assembly comprising:
a shaft adapted for operatively connecting to a motor of the vehicle, the shaft including:
a threaded end portion;
a first splined portion including a first plurality of external splines; and
a second splined portion including a second plurality of external splines,
the first splined portion and the second splined portion being spaced apart in an axial direction;
at least one bearing disposed around the shaft for rotationally supporting the shaft on the vehicle, the at least one bearing being disposed between the first splined portion and the second splined portion in the axial direction;
an integral braking hub disposed on and connected to the shaft, the integral braking hub including:
a central hub portion including a plurality of internal splines engaging the first plurality of external splines of the first splined portion of the shaft, and
a brake disc portion extending radially from the central hub portion, the brake disc portion being integral with the central hub portion,
the central hub portion and the brake disc portion being formed as a single unit,
at least one of the central hub portion and the brake disc portion defining a plurality of through-holes;
a wheel fastened to the integral braking hub by a plurality of fasteners, each one of the plurality of fasteners passing through a corresponding one of the plurality of through-holes; and
a nut fastened to the threaded end portion of the shaft, the wheel being disposed between the nut and the brake disc portion in an axial direction of the shaft.

2. The wheel hub assembly of claim 1, wherein:
the wheel includes:
a rim, and
a tire mounted on the rim;
the nut has a frustoconical surface on a wheel facing side of the nut; and
the rim has a corresponding frustoconical recess for receiving the nut.

3. The wheel hub assembly of claim 1, further comprising a locking member extending at least partially through the nut and the shaft.

4. The wheel hub assembly of claim 1, further comprising a gear disposed on the shaft, the gear defining a plurality of internal gear splines engaging the second plurality of external splines of the second splined portion, the gear being adapted for operatively connecting the shaft to the motor of the vehicle.

5. The wheel hub assembly of claim 1, wherein a largest diameter of the shaft is disposed between the at least one bearing and the second splined portion in the axial direction.

6. The wheel hub assembly of claim 1, further comprising a caliper and brake pad assembly for engaging with the brake disc portion of the integral braking hub for braking the wheel, the caliper and brake pad assembly being adapted for connecting to a rear suspension system of the vehicle.

7. A vehicle comprising:
a frame;
at least one front suspension system connected to the frame;
at least one front ground engaging member operatively connected to the at least one front suspension system;
at least one seat connected to and supported by the frame;
a motor connected to and supported by the frame;
a rear suspension system connected to the frame; and
the wheel hub assembly of claim 1.

* * * * *